(12) United States Patent
Yoshimatsu et al.

(10) Patent No.: US 11,745,763 B2
(45) Date of Patent: Sep. 5, 2023

(54) VEHICLE TRAVEL ASSISTANCE METHOD AND VEHICLE TRAVEL ASSISTANCE DEVICE

(71) Applicant: Nissan Motor Co., Ltd., Yokohama (JP)

(72) Inventors: Yuka Yoshimatsu, Kanagawa (JP); Takefumi Goto, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 17/911,550

(22) PCT Filed: Mar. 19, 2020

(86) PCT No.: PCT/IB2020/000278
§ 371 (c)(1),
(2) Date: Sep. 14, 2022

(87) PCT Pub. No.: WO2021/186201
PCT Pub. Date: Sep. 23, 2021

(65) Prior Publication Data
US 2023/0120172 A1    Apr. 20, 2023

(51) Int. Cl.
*B60W 30/095* (2012.01)
*B60W 60/00* (2020.01)
(Continued)

(52) U.S. Cl.
CPC ........ *B60W 60/0011* (2020.02); *B60W 30/09* (2013.01); *B60W 30/0956* (2013.01);
(Continued)

(58) Field of Classification Search
CPC ............. B60W 60/0011; B60W 30/09; B60W 30/0956; B60W 30/146; B60W 30/162;
(Continued)

(56) References Cited

U.S. PATENT DOCUMENTS

2004/0056778 A1* 3/2004 Hilliard ................. G08G 1/042
                                                    340/933
2013/0033368 A1    2/2013 Fukamachi
(Continued)

FOREIGN PATENT DOCUMENTS

CN    102844799 A    12/2012
CN    106846901 A    6/2017
(Continued)

*Primary Examiner* — Donald J Wallace
*Assistant Examiner* — Daniel M. Robert
(74) *Attorney, Agent, or Firm* — Young Basile Hanlon & MacFarlane, P.C.

(57) ABSTRACT

A travel assistance method and a travel assistance device for a vehicle is capable of avoiding any risk that may arise. The method includes obtaining a risk potential of an object detected by the vehicle, associating the risk potential of the object with an encounter location at which the object is encountered, accumulating the risk potential at the encounter location, and using the accumulated risk potential to obtain a primary estimated risk potential of the object predicted to be encountered at the encounter location. The primary estimated risk potential is lower than the risk potential obtained when detecting the object. The method further includes obtaining a secondary estimated risk potential using a predicted travel movement of another vehicle that avoids a risk due to the primary estimated risk potential, and when traveling at the encounter location again, autonomously controlling travel of the vehicle using the secondary estimated risk potential.

31 Claims, 16 Drawing Sheets

(51) Int. Cl.
*B60W 30/18* (2012.01)
*B60W 30/09* (2012.01)
*B60W 30/14* (2006.01)
*B60W 30/16* (2020.01)

(52) U.S. Cl.
CPC ........ *B60W 30/146* (2013.01); *B60W 30/162* (2013.01); *B60W 30/18159* (2020.02); *B60W 30/18163* (2013.01); *B60W 2554/4041* (2020.02); *B60W 2554/4044* (2020.02); *B60W 2554/4045* (2020.02); *B60W 2554/80* (2020.02)

(58) Field of Classification Search
CPC ..... B60W 30/18159; B60W 30/18163; B60W 2554/4041; B60W 2554/4044; B60W 2554/4045; B60W 2554/80
See application file for complete search history.

(56) References Cited

U.S. PATENT DOCUMENTS

| | | | |
|---|---|---|---|
| 2013/0204516 A1* | 8/2013 | Fukamachi | G06T 7/73 701/300 |
| 2014/0278052 A1* | 9/2014 | Slavin | G01C 21/3492 701/400 |
| 2016/0272199 A1 | 9/2016 | Kawahara et al. | |
| 2019/0147260 A1* | 5/2019 | May | B60W 50/14 382/103 |
| 2019/0316919 A1* | 10/2019 | Keshavamurthy | G08G 1/096844 |
| 2019/0382013 A1* | 12/2019 | Li | B60W 30/095 |
| 2019/0383626 A1* | 12/2019 | Fowe | G08G 1/0145 |
| 2020/0062249 A1 | 2/2020 | Light et al. | |
| 2020/0086859 A1* | 3/2020 | McGill, Jr. | G05D 1/0088 |

FOREIGN PATENT DOCUMENTS

| | | | |
|---|---|---|---|
| JP | 2018-058588 A | | 4/2018 |
| JP | 2019-106049 A | | 6/2019 |
| JP | 2019106049 A | * | 6/2019 |
| JP | 2019-211830 A | | 12/2019 |
| JP | 2019211830 A | * | 12/2019 |
| JP | 2021-123254 A | | 8/2021 |
| WO | 2020/044512 A1 | | 3/2020 |

* cited by examiner

FIG. 8

| Date | Time slot | Road Section | Lane | Weather | Risk A | Risk B | Risk C | Risk D |
|---|---|---|---|---|---|---|---|---|
| 19/2/5 | 6:00-7:00 | 0001 | 1 | Fine | 1 | 1 | 0 | 0 |
| 19/2/6 | 6:00-7:00 | 0001 | 1 | Cloudy | 0 | 1 | 0 | 0 |
| 19/2/7 | 6:00-7:00 | 0001 | 1 | Rainy | 1 | 1 | 0 | 0 |
| 19/2/5 | 6:00-7:00 | 0001 | 2 | Fine | 0 | 0 | 0 | 0 |
| 19/2/6 | 6:00-7:00 | 0001 | 2 | Cloudy | 0 | 0 | 0 | 0 |
| 19/2/7 | 6:00-7:00 | 0001 | 2 | Rainy | 0 | 1 | 0 | 0 |
| 19/2/5 | 6:00-7:00 | 0001 | 3 | Fine | 0 | 0 | 0 | 0 |
| 19/2/6 | 6:00-7:00 | 0001 | 3 | Cloudy | 0 | 1 | 0 | 0 |
| 19/2/7 | 6:00-7:00 | 0001 | 3 | Rainy | 0 | 1 | 0 | 0 |
| 19/2/5 | 6:00-7:00 | 0001 | 4 | Fine | 0 | 0 | 0 | 0 |
| 19/2/6 | 6:00-7:00 | 0001 | 4 | Cloudy | 0 | 1 | 0 | 0 |
| 19/2/7 | 6:00-7:00 | 0001 | 4 | Rainy | 0 | 1 | 0 | 0 |
| | | ⋮ | | | | | | |
| 19/2/5 | 6:00-7:00 | 0002 | 1 | Fine | 1 | 0 | 0 | 0 |
| 19/2/6 | 6:00-7:00 | 0002 | 1 | Cloudy | 1 | 0 | 0 | 0 |
| 19/2/7 | 6:00-7:00 | 0002 | 1 | Rainy | 1 | 0 | 0 | 0 |
| 19/2/5 | 6:00-7:00 | 0002 | 2 | Fine | 0 | 0 | 0 | 0 |
| 19/2/6 | 6:00-7:00 | 0002 | 2 | Cloudy | 0 | 0 | 0 | 0 |
| 19/2/7 | 6:00-7:00 | 0002 | 2 | Rainy | 0 | 0 | 0 | 0 |
| | | ⋮ | | | | | | |

FIG. 9

| Road Section | Lane | Potential of Risk A | Encounter probability with Risk A | Potential of Risk B | Encounter probability with Risk B | Potential of Risk C | Encounter probability with Risk C | ... |
|---|---|---|---|---|---|---|---|---|
| 0001 | 1 | 100 | 66 | 80 | 100 | 50 | 0 | |
| 0001 | 2 | 100 | 0 | 80 | 0 | 50 | 0 | |
| 0001 | 3 | 100 | 0 | 80 | 66 | 50 | 0 | |
| 0001 | 4 | 100 | 0 | 80 | 66 | 50 | 0 | |
| 0002 | 1 | 100 | 100 | 80 | 0 | 50 | 0 | |
| 0002 | 2 | 100 | 0 | 80 | 0 | 50 | 0 | |
| 0003 | 1 | 100 | 33 | 80 | 0 | 50 | 0 | |
| 0003 | 2 | 100 | 0 | 80 | 0 | 50 | 0 | |
| 0004 | 1 | 100 | 0 | 80 | 0 | 50 | 66 | |
| 0004 | 2 | 100 | 0 | 80 | 33 | 50 | 0 | |
| ... | | | | | | | | |

VEHICLE TRAVEL ASSISTANCE METHOD AND VEHICLE TRAVEL ASSISTANCE DEVICE

TECHNICAL FIELD

The present invention relates to a travel assistance method and a travel assistance device for a vehicle.

BACKGROUND

As this kind of travel assistance device, a vehicle control device is known (JP2019-106049A). The vehicle control device operates to: classify traffic participants around a subject vehicle in accordance with an attribute and a state based on the trajectories and positions of the traffic participants and the subject vehicle and lane information; apply an actualized (existing) risk corresponding to the classification for each traffic participant around the subject vehicle to generate an actualized (existing) risk map based on the classification results of the traffic participants around the subject vehicle and the actualized risk which is preliminarily learnt for each classification; determine as an optimum action the transition to or stop at a state in which a large amount of reward is obtained by a reward function using the actualized risk map among the states corresponding to positions of the subject vehicle on a plurality of route candidates; and control the subject vehicle in accordance with the action thus determined.

SUMMARY

In the above prior art, however, the optimum action is determined by using the actualized risk map after detecting the traffic participants such as surrounding automobiles and pedestrians; therefore, it is possible to perform the travel assistance for the detected objects, but it is not possible to perform the travel assistance corresponding to a risk that is expected to be encountered. That is, the above prior art has a problem in that the travel assistance cannot be performed to avoid any risk that may arise.

A problem to be solved by the present invention is to provide a travel assistance method and a travel assistance device for a vehicle capable of avoiding any risk that may arise.

The present invention includes obtaining a risk potential of a detected object, accumulating the obtained risk potential in association with an encounter location at which the object is encountered, and using the accumulated risk potential to obtain a primary estimated risk potential of the object predicted to be encountered at the encounter location. The primary estimated risk potential is lower than the risk potential obtained when detecting the object. The above problem is solved through obtaining a secondary estimated risk potential lower than the primary estimated risk potential using a predicted travel movement of another vehicle that avoids a risk due to the obtained primary estimated risk potential, and when traveling at the encounter location again, autonomously controlling travel of the vehicle using the obtained secondary estimated risk potential.

According to the present invention, the risk potential can be estimated before reaching the encounter location at which the detected object is encountered, and it is therefore possible to perform, even before detecting the object, the travel assistance capable of avoiding any risk that may arise.

BRIEF DESCRIPTION OF THE DRAWINGS

FIG. 8 is a diagram illustrating an accumulation example of information on surrounding objects obtained as a result of traveling along the travel route of FIG. 6 a plurality of times and stored in a storage unit of FIG. 3;

FIG. 9 is a diagram illustrating an example of a risk potential and an encounter probability generated by a predicted risk map generation unit of FIG. 3 using the accumulated information of the surrounding objects of FIG. 8;

DETAILED DESCRIPTION

Hereinafter, one or more embodiments of the present invention will be described with reference to the drawings. The travel assistance method for a vehicle and the travel assistance device for a vehicle according to the present invention can be applied not only to autonomous travel control that autonomously executes the speed control of the vehicle and/or the steering control of the vehicle, but also to a navigation system that presents an appropriate travel route, when the driver performs manual driving, to assist the driver's manual driving. When applied to autonomous travel control of the vehicle, the travel assistance method and travel assistance device according to the present invention can be applied not only to autonomous control of both the speed and the steering, but also to autonomous control of one of the speed and the steering and manual control of the other.

The following description will be made for an example in which the travel assistance method for a vehicle and the travel assistance device for a vehicle according to the present invention are applied to a vehicle having an autonomous travel control function. The description of the following embodiments is made on the assumption that the vehicle travels on the left side in a country having a left-side traffic regulation. In countries having right-side traffic regulations, vehicles travel on the right side, so the right and left in the following description are to be read symmetrically.

Figure 1:
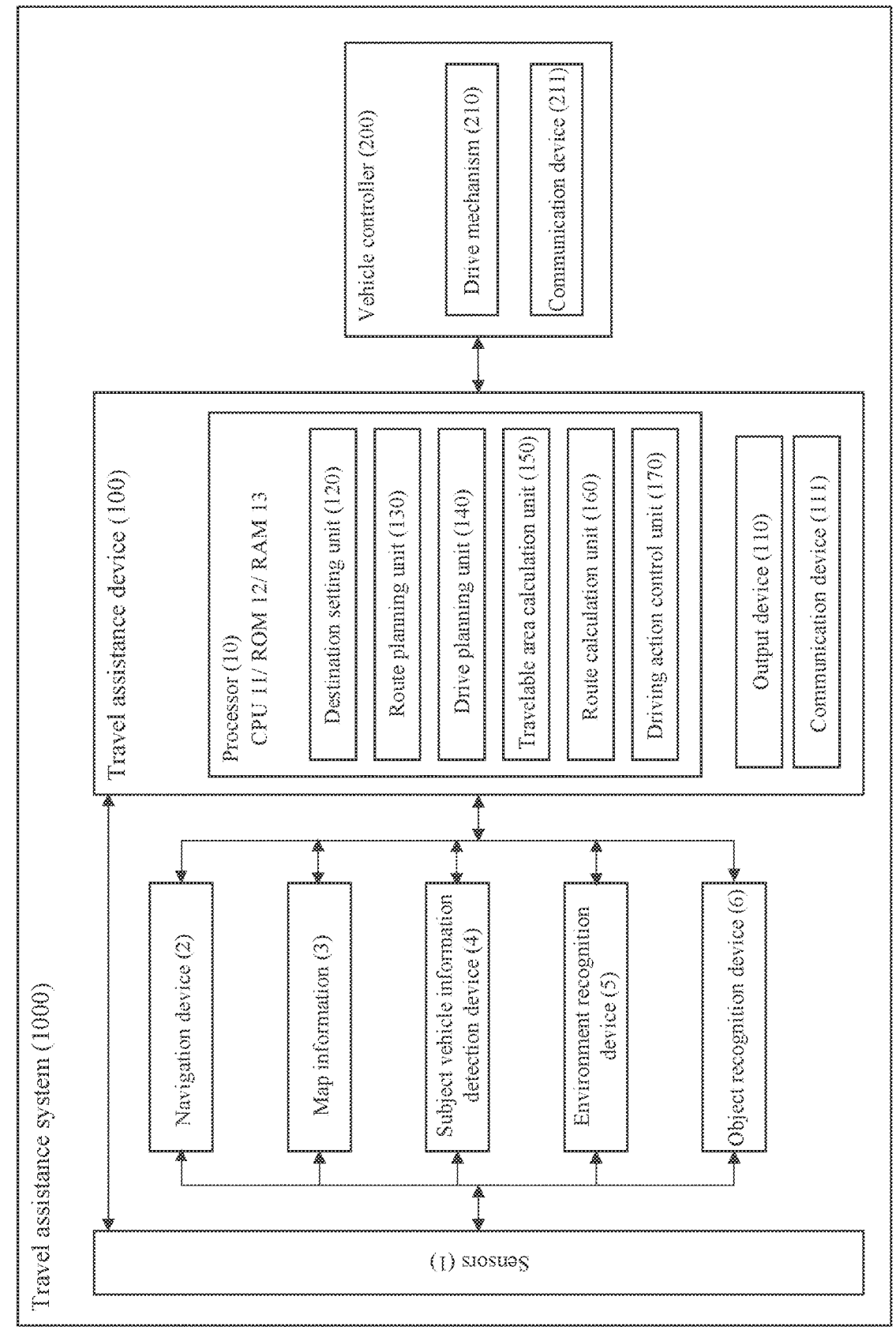
FIG. 1 is a block diagram illustrating a travel assistance method for a vehicle of the present invention and a travel assistance system including a travel assistance device.

FIG. 1 is a block diagram illustrating the configuration of a travel assistance system 1000. The travel assistance system 1000 according to the present embodiment includes a travel assistance device 100 and a vehicle controller 200. The travel assistance device 100 of the present embodiment includes a communication device 111 while the vehicle controller 200 also includes a communication device 211, and the travel assistance device 100 and the vehicle controller 200 exchange information with each other via wired communication or wireless communication.

More specifically, the travel assistance system 1000 according to the present embodiment includes one or more sensors 1, a navigation device 2, map information 3 stored in a readable recording medium, a subject vehicle information detection device 4, an environment recognition device 5, an object recognition device 6, the travel assistance device 100, and the vehicle controller 200. As illustrated in FIG. 1, the sensors 1, the navigation device 2, the map information 3 stored in the readable recording medium, the subject vehicle information detection device 4, the environment recognition device 5, the object recognition device 6, and each device of the travel assistance device 100 are connected to one another via a controller area network (CAN) or other onboard LAN to mutually exchange information.

The sensors 1 of the present embodiment detect information regarding the travel environment including the presence of obstacles located around the subject vehicle, such as all around the front, sides, and rear of the subject vehicle, and other situations around the subject vehicle. The sensors 1 of the present embodiment include devices for recognizing environmental information around the subject vehicle, for example, cameras including imaging elements such as CCDs, ultrasonic cameras, infrared cameras, or other similar cameras. The cameras of the present embodiment, which are installed in the subject vehicle, capture images around the subject vehicle and acquire image data including target vehicles present around the subject vehicle.

The sensors 1 of the present embodiment include a ranging sensor, and the ranging sensor calculates the relative distance and relative speed between the subject vehicle and an object. Information on the object detected by the ranging sensor is output to a processor 10. Examples of the ranging sensor for use include those of schemes known at the time of filing the present application, such as laser radar, millimeter wave radar, other similar radar (LRF or the like), a light detection and ranging (LiDAR) unit, and ultrasonic radar.

One or more cameras and a ranging sensor can be adopted as the sensors 1 of the present embodiment. The sensors 1 of the present embodiment are provided with a sensor fusion function of complementing the missing information in the detection information by integrating or synthesizing the sensor information from a plurality of different sensors, such as the detection information from the cameras and the detection information from the ranging sensor, to obtain the environment information around the subject vehicle. This sensor fusion function may be incorporated in the environment recognition device 5, the object recognition device 6, or other controller or logic.

Objects detected by the sensors 1 include lane boundary lines of roads, center lines, road surface signs, median strips, guardrails, curbstones, highway side walls, road signs, traffic lights, pedestrian crossings, construction sites, accident sites, and traffic restrictions. Objects detected by the sensors 1 include automobiles (other vehicles) other than the subject vehicle, motorcycles, bicycles, and pedestrians. Objects detected by the sensors 1 include obstacles. Obstacles are objects that can affect the travel of the subject vehicle. The sensors 1 detect at least information regarding obstacles. Regarding an object detected by the sensors 1, positional information of the object can be detected from the self-position information of the subject vehicle, which is obtained by the GPS or the like and represents the position of the subject vehicle traveling, and the relative position (distance and direction) between the subject vehicle and the object. Additionally or alternatively, regarding an object detected by the sensors 1, positional information of the object can be detected in association with map information from the map information, the self-position information of the subject vehicle, which is obtained by odometry and represents the position of the subject vehicle traveling, and the relative position (distance and direction) between the subject vehicle and the object.

The navigation device 2 of the present embodiment refers to the map information 3 to calculate the travel lane/travel route from the current position detected by the subject vehicle information detection device 4 to a destination. The travel lane or travel route refers to a road on which the subject vehicle travels, or a line shape in which the direction (inbound/outbound) and the lane are identified. The travel route includes information on the travel lane. Hereinafter, the travel lane may be simply described as a lane.

The map information 3 of the present embodiment is stored in a readable state in a recording medium provided in the travel assistance device 100, an onboard device, or a server device, and is used for route generation and/or driving control. The map information 3 of the present embodiment includes road information, facility information, and their attribute information. Road information and road attribute information include information on a road width, a radius of curvature, a road shoulder structure, a road traffic regulation (speed limit, whether lane change is permitted), a merging point of a road, a branching point, a position at which the number of lanes increases/decreases, and other similar information. The map information 3 of the present embodiment is so-called high-definition map information, and according to the high-definition map information, the movement trajectory for each lane can be perceived. The high-definition map information includes two-dimensional positional information and/or three-dimensional positional information at each map coordinate, road/lane boundary information at each map coordinate, road attribute information, lane inbound/outbound information, lane identification information, and connection destination lane information.

Additionally or alternatively, the map information 3 of the present embodiment includes information on a travel route boundary that represents a boundary between the route on which the subject vehicle travels and another area. The travel route on which the subject vehicle travels refers to a road for the subject vehicle to travel, and the form of the travel route is not particularly limited. The travel route boundary exists on each of the right and left sides with respect to the traveling direction of the subject vehicle. The form of the travel route boundary is not particularly limited, and examples thereof include road surface signs and road structures. Examples of the travel route boundary of a road surface sign include lane boundary lines and center lines. Examples of the travel route boundary of a road structure include median strips, guardrails, curbstones, tunnels, and highway side walls. For a point at which the travel route boundary cannot be clearly specified (e.g., inside an intersection), the travel route boundary is preliminarily set in the map information 3. The preliminarily set travel route boundary is an imaginary travel route boundary rather than a road surface sign or a road structure that actually exists.

The subject vehicle information detection device 4 of the present embodiment acquires detection information regarding the state of the subject vehicle. The state of the subject vehicle includes the current position, speed, acceleration, attitude, and vehicle performance of the subject vehicle. These may be acquired from the vehicle controller 200 of the subject vehicle or may otherwise be acquired from each sensor of the subject vehicle. The subject vehicle information detection device 4 of the present embodiment acquires the current position of the subject vehicle based on the information acquired from the global positioning system (GPS) unit, gyro sensor, and/or odometry of the subject vehicle. The subject vehicle information detection device 4 of the present embodiment acquires the speed and acceleration of the subject vehicle from a vehicle speed sensor of the subject vehicle. The subject vehicle information detection device 4 of the present embodiment acquires the attitude data of the subject vehicle from an inertial measurement unit (IMU) of the subject vehicle.

The environment recognition device 5 of the present embodiment recognizes the positional information acquired by the sensors 1, the object recognition information obtained from the image information and ranging information around the subject vehicle, and information regarding the environment established based on the map information. The environment recognition device 5 of the present embodiment integrates a plurality of information items to generate the environmental information around the subject vehicle. The object recognition device 6 of the present embodiment also uses the map information 3 together with the image information and ranging information around the subject vehicle, which are acquired from the sensors 1, thereby to predict the recognition and/or movement of an object around the subject vehicle.

The vehicle controller 200 of the present embodiment is an onboard computer such as an electronic control unit (ECU) and electronically controls a drive mechanism 210 responsible for the driving of the vehicle. The vehicle controller 200 controls a drive device, a braking device, and a steering device included in the drive mechanism 210 to allow the subject vehicle to travel in accordance with a target vehicle speed and a target travel route. Control instructions based on a driving plan of the subject vehicle are input to the vehicle controller 200 from the travel assistance device 100. The target vehicle speed, target travel route, and driving plan of the subject vehicle will be described later.

The drive mechanism 210 of the present embodiment includes an electric motor and/or an internal-combustion engine as the traveling drive sources, a power transmission device including a drive shaft and an automatic transmission that transmit the output of the traveling drive sources to the drive wheels, a drive device that controls the power transmission device, a braking device that brakes the wheels, a steering device that controls the wheels to be steered in accordance with the steering angle of the steering wheel (so-called handle), and other necessary components. Controls signals corresponding to the target vehicle speed are input to the vehicle controller 200 from the travel assistance device 100. The vehicle controller 200 generates respective control signals for these components of the drive mechanism 210 based on the control signals, which are input from the travel assistance device 100, and executes the driving control including acceleration/deceleration of the vehicle. Control information is transmitted to the drive device of the drive mechanism 210, which can thereby autonomously control the speed of the vehicle.

Additionally or alternatively, the vehicle controller 200 of the present embodiment uses one or more of the lane information stored in the map information 3, the information recognized by the environment recognition device 5, and the information acquired by the object recognition device 6 to control the steering device of the drive mechanism 210 so that the subject vehicle travels while maintaining a predetermined lateral position (position in the right-left direction of the vehicle) with respect to the target travel route. The steering device includes a steering actuator, which includes a motor and other necessary components attached to the steering column shaft. Controls signals corresponding to the target travel route are input to the vehicle controller 200 from the travel assistance device 100. The steering device of the drive mechanism 210 executes the steering control of the vehicle based on the control signals input from the vehicle controller 200. Control information is transmitted to the steering device of the drive mechanism 210, which can thereby autonomously control the steering of the vehicle.

The travel assistance device 100 of the present embodiment controls the driving of the subject vehicle thereby to execute control of assisting the travel of the subject vehicle. As illustrated in FIG. 1, the travel assistance device 100 of the present embodiment includes a processor 10. The processor 10 is a computer including a ROM 12 that is a read only memory (ROM) storing programs for executing the driving control of the subject vehicle, a CPU 11 that is a central processing unit (CPU) as an operation circuit executing the programs stored in the ROM 12 to serve as the travel assistance device 100, and a RAM 13 that is a random access memory (RAM) serving as an accessible storage device. The processor 10 of the present embodiment is responsible for various functions by cooperation of software for achieving the above functions and the above-described hardware. The processor 10 includes the communication device 111 and an output device 110 and outputs various commands for output or input and commands for information read permission or information provision to the vehicle controller 200, the navigation device 2, the map information 3, the subject vehicle information detection device 4, the environment recognition device 5, and the object recognition device 6. The processor 10 mutually exchanges information with the sensors 1, the navigation device 2, the map information 3, the subject vehicle information detection device 4, the environment recognition device 5, the object recognition device 6, and the vehicle controller 200.

The processor 10 of the present embodiment includes a destination setting unit 120, a route planning unit 130, a drive planning unit 140, a travelable area calculation unit 150, a route calculation unit 160, and a driving action control unit 170, which are responsible for respective functions. The processor 10 of the present embodiment is configured by cooperation of the above-described hardware and the software for realizing the destination setting unit 120, the route planning unit 130, the drive planning unit 140, the travelable area calculation unit 150, the route calculation unit 160, and the driving action control unit 170 or executing respective processes.

Figure 2:
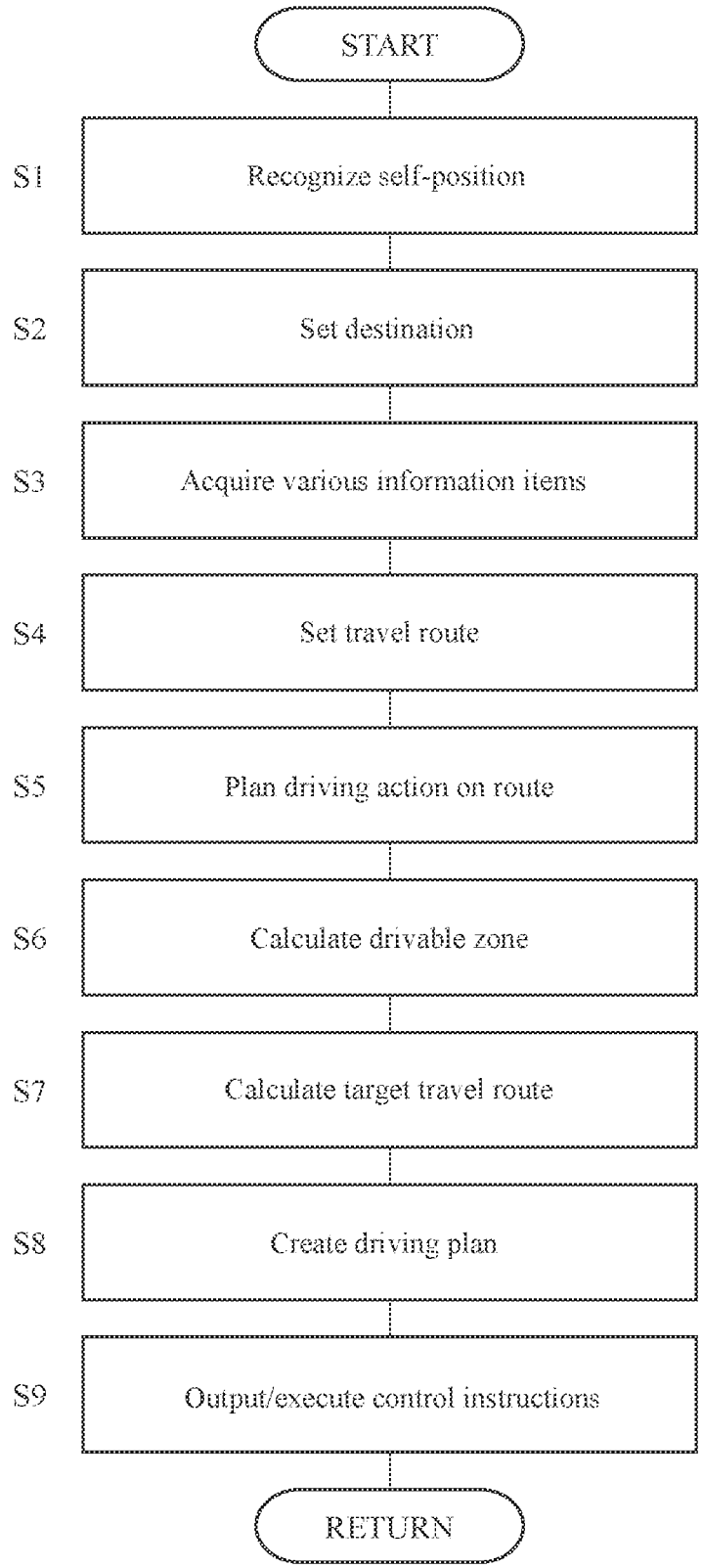
FIG. 2 is a flowchart illustrating an information processing procedure in the travel assistance system of FIG. 1.

The control procedure executed by the processor 10 of the present embodiment will be described with reference to FIG. 2. FIG. 2 is a flowchart illustrating the information processing procedure of the travel assistance system according to the present embodiment. The outline of an autonomous travel control process executed by the travel assistance device 100 will be described with reference to FIG. 2.

In step 1 of FIG. 2, first, the processor 10 operates the destination setting unit 120 to execute a process of acquiring the current position of the subject vehicle based on the detection result of the subject vehicle information detection device 4, and in the subsequent step 2, execute a process of setting a destination of the subject vehicle. The destination may be one that is input by a user or may otherwise be one that is predicted by another device. In the subsequent step 3, the processor 10 operates the route planning unit 130 to acquire various detection information items including the map information 3. In the subsequent step S4, the processor 10 operates the route planning unit 130 to set a travel lane (or travel route) for the destination which is set by the destination setting unit 120. The processor 10 operates the route planning unit 130 to set the travel lane using the information obtained from the environment recognition device 5 and/or the object recognition device 6 in addition to the map information 3 and/or the self-position information. The processor 10 operates the route planning unit 130 to set a road on which the subject vehicle travels, but also to set a lane of the road in which the subject vehicle travels, and thus what is to be set is not limited to a road.

In the subsequent step S5, the processor 10 operates the drive planning unit 140 to execute a process of planning a driving action of the subject vehicle at each point on the route. The driving plan defines driving actions such as progress (GO) and stop (No-GO) at each point. For example, when turning right at an intersection, determinations are made, including a determination as to whether or not to stop at the position of a stop line and a determination as to whether or not to progress regardless of the presence of a vehicle in the oncoming lane.

In the subsequent step 6, for executing the driving action planned in step 5, the processor 10 operates the travelable area calculation unit 150 to execute a process of calculating an area around the subject vehicle in which the subject vehicle can travel (this area will also be referred to as a travelable area) using the information obtained from the environment recognition device 5 and/or the object recognition device 6 in addition to the map information 3 and/or the self-position information. The travelable area is not limited to an area in the lane in which the subject vehicle travels, and may also be a lane adjacent to the lane in which the subject vehicle travels (that lane will also be referred to as an adjacent lane). It suffices that the travelable area is an area in which the subject vehicle can travel, and the travelable area may also be an area other than the area recognized as a lane on the road.

In the subsequent step 7, the processor 10 operates the route calculation unit 160 to execute a process of generating a target travel route along which the subject vehicle travels. In addition to this, the processor 10 operates the driving action control unit 170 to calculate the target vehicle speed and a profile of the target vehicle speed when traveling along the target travel route. The processor 10 may calculate the target deceleration and target acceleration for the current vehicle speed and their profiles as substitute for or in addition to the target vehicle speed. The calculated target vehicle speed may be fed back to the process of generating the target travel route to generate the target travel route so as to suppress the change in behavior of the vehicle and the movement (behavior) which causes an occupant of the vehicle to feel uncomfortable. The generated target travel route may be fed back to the process of calculating the target vehicle speed to calculate the target vehicle speed so as to suppress the change in behavior of the vehicle and the movement (behavior) which causes an occupant of the vehicle to feel uncomfortable.

In step 8, the processor 10 executes a process of creating a driving plan that allows the subject vehicle to travel along the generated target travel route. Additionally or alternatively, the processor 10 executes a process of creating a driving plan that allows the subject vehicle to travel at a speed of the calculated target vehicle speed. Then, in step 9, the processor 10 uses the output device 110 to output control instructions and control command values based on the driving plan to the vehicle controller 200 via the communication device 111, and the drive mechanism 210 which includes various actuators is operated.

To the vehicle controller 200, longitudinal force and lateral force that control the traveling position of the subject vehicle are input based on the command values from the processor 10. In response to these inputs, the behavior of the vehicle body and the behavior of the wheels are controlled so that the subject vehicle autonomously travels while following the target travel route. On the basis of such control, at least one of the drive actuator and the braking actuator of the drive mechanism 210 for the vehicle body, and if necessary the steering actuator of the steering device in addition to the above, operate autonomously to execute the autonomous driving control to the destination. As will be understood, the drive mechanism 210 can also be operated in response to the command values based on the manual operation.

Figure 3:
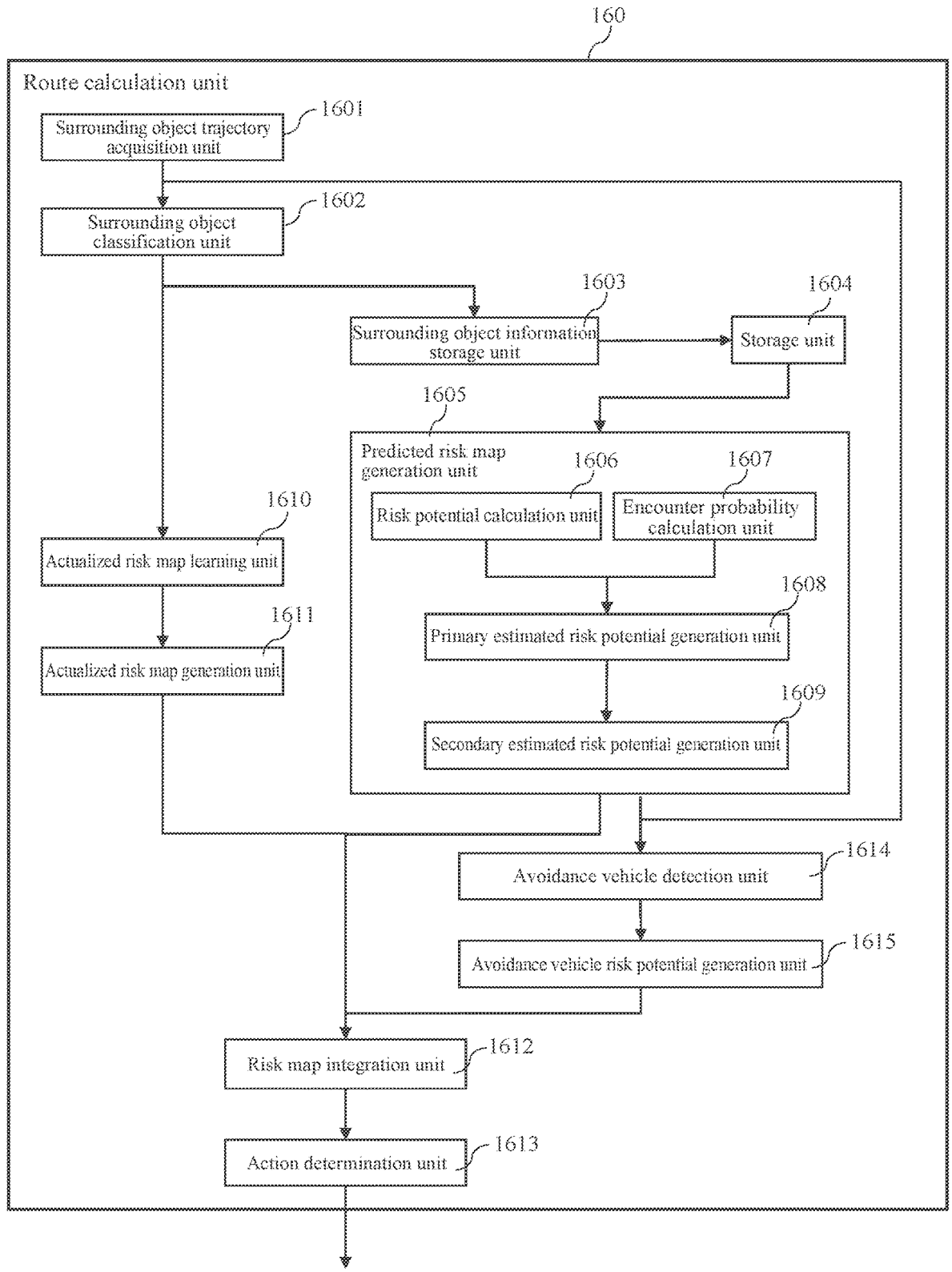
FIG. 3 is a block diagram illustrating an embodiment of a route calculation unit of FIG. 1.

Meanwhile, in steps S1 to S4 of FIG. 2, the travel assistance device 100 of the present embodiment acquires the current position of the subject vehicle and sets, from the set destination of the subject vehicle and the map information 3, the travel route from the current position to the destination. Here, FIG. 3 is a block diagram illustrating an embodiment of the route calculation unit 160 of FIG. 1. The route calculation unit 160 of the present embodiment executes the process of generating the target travel route along which the subject vehicle travels. To obtain a primary estimated risk potential and a secondary estimated risk potential for the process of generating the target travel route, the route calculation unit 160 includes a surrounding object trajectory acquisition unit 1601, a surrounding object classification unit 1602, a surrounding object information storage unit 1603, a storage unit 1604, a predicted risk map generation unit 1605, an actualized risk map learning unit 1610, an actualized risk map generation unit 1611, a risk map integration unit 1612, and an action determination unit 1613. The predicted risk map generation unit 1605 includes a risk potential calculation unit 1606, an encounter probability calculation unit 1607, a primary estimated risk potential generation unit 1608, and a secondary estimated risk potential generation unit 1609. The route calculation unit 160 of the present embodiment may further include an avoidance vehicle detection unit 1614 and an avoidance vehicle risk potential generation unit 1615. The avoidance vehicle detection unit 1614 and the avoidance vehicle risk potential generation unit 1615 can be omitted as needed. Each of these units 1601 to 1615 can be realized by a software program installed in the ROM 12 of the travel assistance device 100. It should be noted that each of these units 1601 to 1615 is merely classified for descriptive purposes for describing the functions exhibited by the execution of the software program and therefore does not determine the scope of rights.

The following embodiments will be described on the assumption that the route calculation unit 160 illustrated in FIGS. 1 and 3 is provided in the vehicle, but a part of the route calculation unit 160 may not necessarily have to be provided on the vehicle side. In particular, in FIG. 3, some or all of the surrounding object information storage unit 1603, the storage unit 1604, the predicted risk map generation unit 1605, the risk potential calculation unit 1606, the encounter probability calculation unit 1607, the primary estimated risk potential generation unit 1608, the secondary estimated risk potential generation unit 1609, the actualized risk map learning unit 1610, the actualized risk map generation unit 1611, the map integration unit 1612, the avoidance vehicle detection unit 1614, and the avoidance vehicle risk potential generation unit 1615 may be provided in a server or the like. When some or all of the units constituting the route calculation unit 160 are provided in a server or the like other than the vehicle and the remaining units are provided in the vehicle, transmission and reception of information between the vehicle and the server can be performed in real time via a telecommunication network such as the Internet. It is also possible to provide the surrounding object information storage unit 1603 and/or the storage unit 1604 in a server and accumulate information regarding objects detected by a plurality of vehicles in the surrounding object information storage unit 1603 and/or the storage unit 1604. In this case, the vehicle which detects an object may not necessarily be the same as the vehicle which uses information on the risk potential. Provided that some or all of the actualized (existing) risk potential, the primary estimated risk potential, and the secondary estimated risk potential are calculated in a server, when at least one of them is used to autonomously control the vehicle, it is possible to acquire the actualized risk potential, the primary estimated risk potential, and the secondary estimated risk potential corresponding to the self-position information from the server.

Additionally or alternatively, the timing of calculating the primary estimated risk potential generated by the primary estimated risk potential generation unit 1608 of the predicted risk map generation unit 1605 and the secondary estimated risk potential generated by the secondary estimated risk potential generation unit 1609 may be the timing of accumulating in the server the estimated risk potentials which are preliminarily calculated in the server, or the primary estimated risk potential and the secondary estimated risk potential may otherwise be calculated at the timing of traveling at the encounter location. Additionally or alternatively, one of the actualized (existing) risk map generated by the actualized risk map generation unit 1611, the predicted risk map generated by the predicted risk map generation unit 1605, and the integrated risk map generated by the risk map integration unit 1612 may be generated in the server and the others may be generated in the vehicle. The primary estimated risk potential and the secondary estimated risk potential may be calculated from the accumulated data or may also be calculated based on information such as construction work information or traffic congestion information available from infrastructure such as a road transportation system.

The surrounding object trajectory acquisition unit 1601 acquires respective trajectories of the traffic participants around the subject vehicle. The traffic participants include automobiles, pedestrians, bicycles, motorcycles, and other objects (obstacles and the like such as construction sections). Automobiles include preceding vehicles, parked vehicles, rearmost vehicle, outflow vehicles (vehicles that travel away from the current lane to another lane), merging vehicles (vehicles that join the current lane from another lane), vehicles that are obstacles, and other vehicles. Pedestrians include children, elderly people, and other pedestrians according to age and pedestrians who are stopped, walking, or running. Bicycles include bicycles for children, elderly people, and other people according to age and bicycles that are stopped or traveling at low speeds or high speeds. Motorcycles include preceding motorcycles, stopped motorcycles, rearmost motorcycle, outflow motorcycles (motorcycles that travel away from the current lane to another lane), merging motorcycles (motorcycles that join the current lane from another lane), motorcycles that are obstacles, and other motorcycles.

For the surrounding object trajectory acquisition unit 1601, the subject vehicle may serve as a probe car while traveling at an arbitrary place to detect and track traffic participants and other objects using the sensors 1 such as a camera and a ranging sensor. The surrounding object trajectory acquisition unit 1601 transmits information items of the positions, speeds, and directions of the traffic participants to the surrounding object classification unit 1602 together with the time stamps. The surrounding object classification unit 1602 classifies the information items of the positions, speeds, and directions of the traffic participants and other objects, which are read from the surrounding object trajectory acquisition unit 1601, based on the classification criteria for the above-described traffic participants and other objects and then transmits the classified information items to the surrounding object information storage unit 1603 and the actualized risk map learning unit 1610. The information items of the positions, speeds, and directions of the traffic participants and other objects transmitted to the surrounding object information storage unit 1603 are used for generation of the primary estimated risk potential and secondary estimated risk potential for the subsequent travel assistance request. On the other hand, the information items of the positions, speeds, and directions of the traffic participants and other objects transmitted to the actualized risk map learning unit 1610 are used for generation of the actualized risk map for the travel assistance which is currently performed. Additionally or alternatively, the surrounding object trajectory acquisition unit 1601 may also transmit the same information as the information regarding the surrounding objects, which is transmitted to the surrounding object classification unit 1602, to the avoidance vehicle detection unit 1614.

The surrounding object classification unit 1602 not only classifies the traffic participants and other objects as described above, but also, particularly in the present embodiment, classifies the objects including the traffic participants, which are acquired by the surrounding object trajectory acquisition unit 1601, into objects that block a lane for a long time, objects that temporarily block a lane, objects that obstruct a traffic flow, or objects that partially obstruct a traffic flow. For example, when the detected object is a parked vehicle or a construction section, it is classified as an object that blocks the lane for a long time, while when the detected object is a vehicle waiting for a right or left turn, a stopped bus, or the like and the movement is currently stopped but the traffic flow will be restored over time, it is classified as an object that temporarily blocks the lane. Additionally or alternatively, when the detected object is a vehicle that does not stop moving but may disturb the traffic flow, such as a merging vehicle or a congested vehicle peculiar to the lane, it is classified as an object that obstructs the traffic flow, while when the detected object is an object that may allow the subject vehicle to continue traveling by avoiding the object in the lateral direction, such as a pedestrian, a bicycle, or a two-wheel vehicle, it is classified as an object that partially obstructs the traffic flow.

For the detected object, the risk potential is preliminarily set for each of these classifications, and the value of the risk potential for each classification is used by the risk potential calculation unit 1606, which will be described later. The risk potential as referred to herein means an index of the height of a risk for the subject vehicle to approach an obstacle (risk feeling index), and the larger the value of the risk potential, the higher the risk for the subject vehicle to approach the obstacle. A relative numerical value is used because of the index of risk feeling. For example, the magnitude relationship of the risk potentials for pedestrians among traffic participants is preliminarily set, such as child pedestrians>elderly pedestrians>other pedestrians. Children and elderly people are the same vulnerable road users as other pedestrians, but children are more active than elderly people, so sudden rushing out to vehicles are expected. Therefore, the risk potential of child pedestrians is set to the highest value. Thus, the risk potentials are preliminarily set for all the traffic participants and other objects from the viewpoint of the height of a risk for the subject vehicle to approach.

Particularly in the present embodiment, high risk potential is set in the order of an object that blocks a lane for a long time, an object that temporarily blocks a lane, an object that obstructs a traffic flow, and an object that partially obstructs a traffic flow. That is, from the viewpoint of objects that obstruct a traffic flow in a lane, the magnitude relationship of the risk potentials for four classifications of an object that blocks a lane for a long time, an object that temporarily blocks a lane, an object that obstructs a traffic flow, and an object that partially obstructs a traffic flow is defined as an object that blocks a lane for a long time>an object that temporarily blocks a lane>an object that obstructs a traffic flow>an object that partially obstructs a traffic flow.

The surrounding object information storage unit 1603 stores the information items of the positions, speeds, directions, and times of the traffic participants and other objects, which are classified by the surrounding object classification unit 1602, in the storage unit 1604. That is, while a plurality of vehicles including the subject vehicle is traveling at an arbitrary place, these vehicles serve as probe cars to repeat the processing by the above surrounding object trajectory acquisition unit 1601, surrounding object classification unit 1602, surrounding object information storage unit 1603, and storage unit 1604, and the risk potentials of the traffic participants and other objects are thereby sequentially accumulated in the storage unit 1604 so as to be associated with the positional information of the positions at which respective objects are detected.

In addition to the positional information of the position at which an object is detected, attribute information such as the date and time when the object is detected and/or the weather may be associated and stored in the storage unit 1604. In this case, an attribute of the date when the object is detected, such as a month, a day of the week, a public holiday, or beginning/end of the month, for example, may be associated, or an attribute of the time, such as morning/afternoon/midnight, time slot for start of working hours/time slot for quitting time, or time slot for meal, for example, may be associated.

When an attribute of the weather is associated, weather information may be acquired via a communication network such as the Internet, but a raindrop sensor included in the sensors 1 may be used to determine whether or not it is rainy, or the subject vehicle information detection device 4 may be used to detect the operating situation of wipers thereby to determine whether or not it is rainy.

Figure 6:
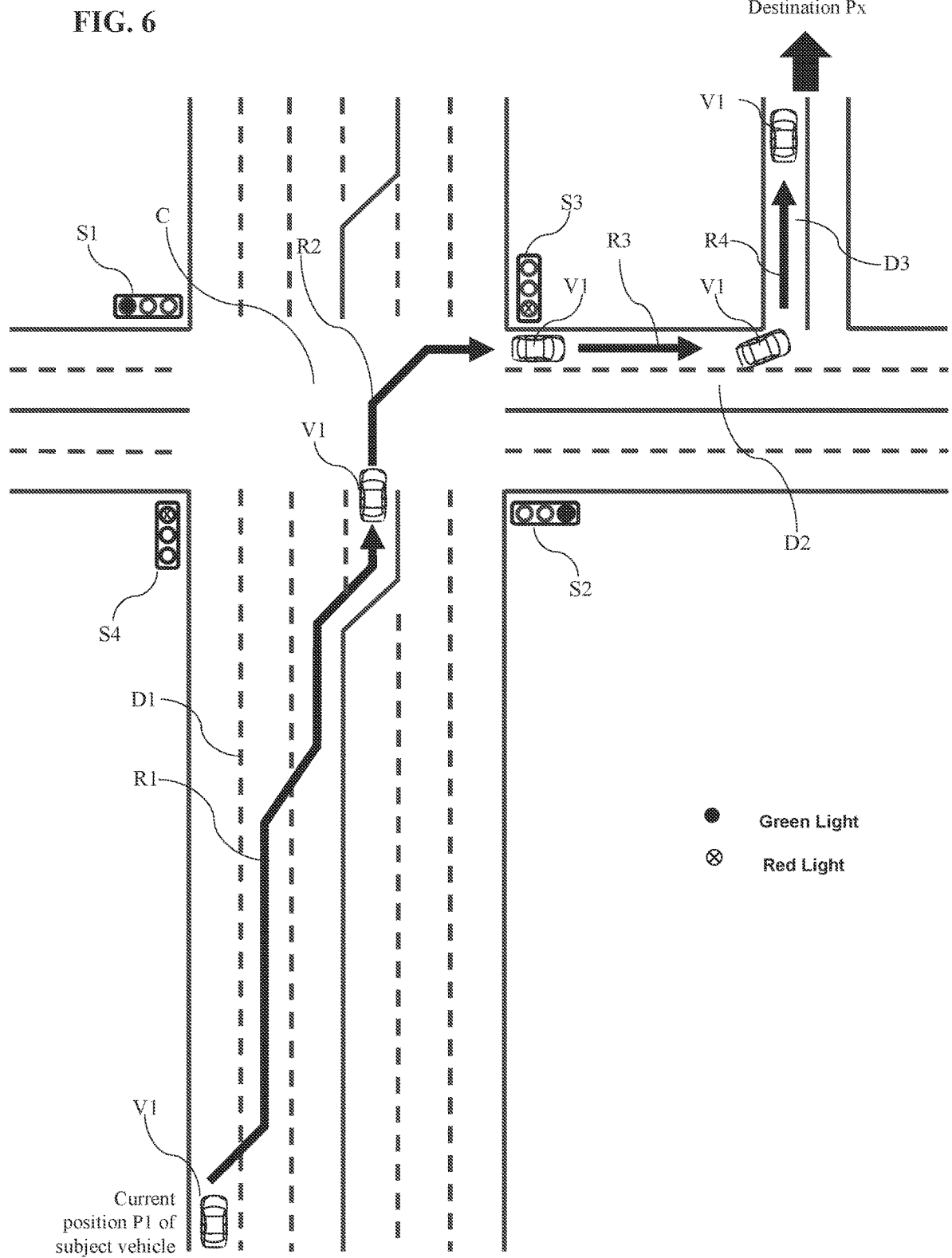
FIG. 6 is a plan view illustrating an example of a travel route from a current position to a destination set by a route planning unit of the travel assistance device of FIG. 1.
Figure 7:
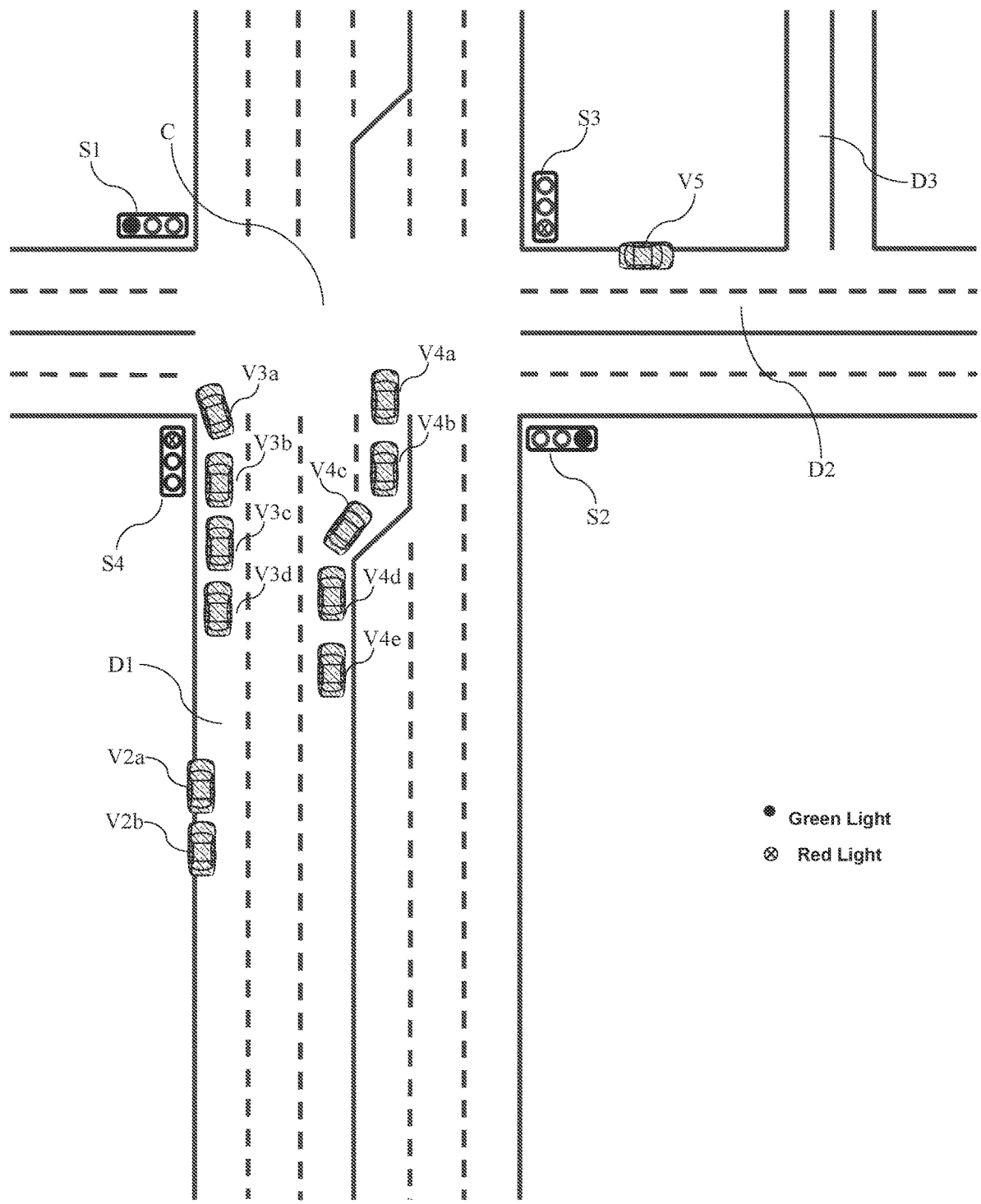
FIG. 7 is a plan view illustrating an example of a traffic situation at a certain date and time on the travel route of FIG. 6.

The description will be made for an example in which while a plurality of vehicles including the subject vehicle is traveling at an arbitrary place, these vehicles serve as probe cars to repeat the processing by the above surrounding object trajectory acquisition unit 1601, surrounding object classification unit 1602, surrounding object information storage unit 1603, and storage unit 1604 of FIG. 3 and the information on the surrounding objects is thereby accumulated in the storage unit 1604 of FIG. 3. FIG. 6 is a plan view illustrating an example of a travel route from the current position to the destination set by the route planning unit 130 of the travel assistance device 100 of the present embodiment, and it is assumed that the travel route is, for example, a part of the commutation route for a subject vehicle V1. FIG. 7 is a plan view illustrating an example of a traffic situation at a certain date and time on the travel route of FIG. 6.

The commutation route for the subject vehicle V1 illustrated in FIG. 6 is a travel route for the subject vehicle V1 to change lanes from the left lane of a road D1, which represents a current position P1 of the subject vehicle V1, to the right-turn-only lane before an intersection C as illustrated by a travel route R1, turn right at the intersection C as illustrated by a travel route R2, enter the left lane of a road D2 after the right turn as illustrated by a travel route R3, turn left at a first T-shaped intersection from the left lane of the road D2, and travel straight ahead as illustrated by a travel route R4. It is assumed that the subject vehicle V1 travels along the commutation routes R1→R2→R3→R4 (these will also be collectively referred to as a travel route R, hereinafter) illustrated in FIG. 6 every day and the traffic situation at a certain date and time is illustrated in FIG. 7. The vehicles illustrated in FIG. 7 are all other vehicles. There are other vehicles V2a and V2b that are stopped in the left lane of the road D1, and congestion occurs due to four other vehicles V3a to V3d that are waiting for a left turn at the intersection C. Congestion also occurs due to five other vehicles V4a to V4e that are waiting for a right turn in the right lane and right-turn-only lane of the road D1, and there is another vehicle V5 that is stopped in the left lane of the road D2.

S1 to S4 in FIG. 6 represent traffic lights, and it is assumed that in the intersection C for left-side traffic in FIG. 6, vehicles traveling in the left-side lanes extending in the up-down direction of the drawing travel to follow the traffic light S1, vehicles traveling in the right-side lanes extending in the up-down direction of the drawing travel to follow the traffic light S2, vehicles traveling in the upper-side lanes extending in the right-left direction of the drawing travel to follow the traffic light S3, and vehicles traveling in the lower-side lanes extending in the right-left direction of the drawing travel to follow the traffic light S4. It is also assumed that in the travel scene of FIG. 6, the green lights on the left side of the traffic lights S1 and S2 are lit and the red lights on the right side of the traffic lights S3 and S4 are lit. The settings for the traffic lights S1 to S4 are the same for the travel scenes illustrated in FIG. 7 and FIGS. 10 to 14.

In such a situation, assuming that the subject vehicle travels along the travel route R illustrated in FIG. 6 at a certain date and time (from 6:00 to 7:00 on Feb. 5, 2019), first, the other vehicles V2a and V2b (the risk potential is defined as Risk A) which are stopped in the left lane (defined as Lane 1) of the road D1 (Road Section is defined as 0001) are detected and it is thereby stored that there is a risk potential of Risk A in Lane 1 of Road Section 0001 at this date and time. Then, the four other vehicles V3a to V3d (the risk potential is defined as Risk B) which are lined up in the left lane of the road D1 to wait for the left turn at the intersection C are detected and it is thereby stored that there is a risk potential of Risk B in Lane 1 of Road Section 0001 at this date and time (from 6:00 to 7:00 on Feb. 5, 2019). Likewise, the five other vehicles V4a to V4e (the risk potential is defined as Risk B) which are waiting for the right turn are detected in the right lane (defined as Lane 3) and right-turn-only lane (defined as Lane 4) of the road D1 and it is thereby stored that there is a risk potential of Risk B in Lanes 3 and 4 of Road Section 0001 at this date and time (from 6:00 to 7:00 on Feb. 5, 2019). Likewise, the other vehicle V5 (the risk potential is defined as Risk A) which is stopped is detected in the left lane (defined as Lane 1) of the road D2 (Road Section is defined as 0002) and it is thereby stored that there is a risk potential of Risk A in Lane 1 of Road Section 0002 at this date and time (from 6:00 to 7:00 on Feb. 5, 2019). On the other hand, no object is detected in the center lane (defined as Lane 2) of Road Section 0001 or the right lane (defined as Lane 2) of Road Section 0002 other than the above, and the risk potential for object detection is therefore stored as 0 (zero).

FIG. 8 is a diagram illustrating an accumulation example of information on surrounding objects obtained as a result of traveling along the travel route of FIG. 6 a plurality of times and stored in the storage unit 1604 of FIG. 3. In the columns of Risks A to D in the figure, the number "1" indicates that the corresponding risk is "present" while the number "0" indicates that the corresponding risk is "absent." As described above, by traveling on the commutation route R under the traffic situation illustrated in FIG. 7 from 6:00 to 7:00 on Feb. 5, 2019, it is stored that in the rows of the date and time from 6:00 to 7:00 on Feb. 5, 2019 of FIG. 8, there are risk potentials of Risks A and B in Lane 1 of Road Section 0001, there is a risk potential of Risk B in Lanes 3 and 4 of Road Section 0001, and there is a risk potential of Risk A in Lane 1 of Road Section 0002, and it is also stored that a risk of Risk A, B, C, or D is not detected in the other road sections or lanes.

Likewise, it is stored that in the rows of the date and time from 6:00 to 7:00 on Feb. 6, 2019 of FIG. 8, there is a risk potential of Risk B in Lane 1 of Road Section 0001 and there is a risk potential of Risk A in Lane 1 of Road Section 0002, and it is also stored that a risk of Risk A, B, C, or D is not detected in the other road sections or lanes. Likewise, it is stored that in the rows of the date and time from 6:00 to 7:00 on Feb. 7, 2019 of FIG. 8, there are risk potentials of Risks A and B in Lane 1 of Road Section 0001, there is a risk potential of Risk B in Lanes 3 and 4 of Road Section 0001, and there is a risk potential of Risk A in Lane 1 of Road Section 0002, and it is also stored that a risk of Risk A, B, C, or D is not detected in the other road sections or lanes.

Referring again to FIG. 3, when the subject vehicle V1 inputs a destination Px to start traveling from now or when creating a travel plan, the route calculation unit 160 of the present embodiment obtains the primary estimated risk potential and the secondary estimated risk potential for the entire area of the travel route R1→R2→R3→R4 from the current position P1 of the subject vehicle V1 to the destination Px and sets a travel route of the vehicle based on the primary estimated risk potential and the secondary estimated risk potential. The primary estimated risk potential and the secondary estimated risk potential are estimated for each traveling position and obtained from the risk potential at each traveling position (which is also the encounter location with a detected object, here and hereinafter) accumulated preliminarily in the storage unit 1604 and the encounter probability with an object. Additionally or alternatively, another vehicle that avoids the primary estimated risk potential may be detected to obtain an avoidance vehicle risk potential, and the travel route of the vehicle may be set based on the avoidance vehicle risk potential. The following description will be made for methods of obtaining the risk potential at each traveling position and the encounter probability with an object, etc. for the area of the travel route R illustrated in FIG. 6, but the same methods can also be applied to other areas.

First, a method of obtaining the primary estimated risk potential will be described. The risk potential calculation unit 1606 extracts, from the information accumulated in the storage unit 1604, the risk potential in each road section of the travel route from the current position to the destination. In parallel with this, the encounter probability calculation unit 1607 obtains, from the information also accumulated in the storage unit 1604, the encounter probability in each road section of the travel route from the current position to the destination. The timing of obtaining the encounter probability may be periodic or may also be the timing when acquiring the encounter probability. FIG. 9 is a diagram illustrating an example of the risk potential and the encounter probability generated by the risk potential calculation unit 1606 and encounter probability calculation unit 1607 of the predicted risk map generation unit 1605 using the accumulated information of the surrounding objects illustrated in FIG. 8. The risk potential of Risk A is 100, the risk potential of Risk B is 80, the risk potential of Risk C is 50, the risk potential of Risk D is 20, and the columns of Risk D are omitted in FIG. 9.

As illustrated in FIG. 8, in Lane 1 of Road Section 0001, Risk A has been detected twice while traveling three times, and an object of Risk B has been detected on each day while traveling three times, but other Risk C or D has not been detected. As illustrated in FIG. 9, therefore, the encounter probability of Risk A in Lane 1 of Road Section 0001 is calculated as 66% (=2÷3), the encounter probability of Risk B is calculated as 100%, and the encounter probabilities of Risks C and D are calculated as 0%. Likewise, in Lane 2 of Road Section 0001, an object of Risk A, B, C, or D has not been detected on any of the days as illustrated in FIG. 8. As illustrated in FIG. 9, therefore, the encounter probabilities of Risks A to D in Lane 2 of Road Section 0001 are all calculated as 0%. As illustrated in FIG. 8, in each of Lanes 3 and 4 of Road Section 0001, an object of Risk B has been detected twice while traveling three times; therefore, as illustrated in FIG. 9, the encounter probability of Risk B in Lanes 3 and 4 of Road Section 0001 is calculated as 66% (=2÷3). As illustrated in FIG. 8, in Lane 1 of Road Section 0002, an object of Risk A has been detected on each day while traveling three times; therefore, as illustrated in FIG. 9, the encounter probability of Risk A in Lane 1 of Road Section 0002 is calculated as 100%.

The primary estimated risk potential generation unit 1608 multiplies the risk potential for each lane of each road section divided in the extending direction of the road by a larger coefficient as the encounter probability is higher, and adds the risk potentials, which are thus multiplied by respective coefficients, to obtain the primary estimated risk potential. The risk potential multiplied by the coefficient is obtained for each road section divided, for example, by 100 m with respect to the extending direction of the road, and for a road having a plurality of lanes, it is obtained for each lane.

The coefficient to be multiplied by the risk potential is not particularly limited, provided that the coefficient is larger as the encounter probability is higher, and the numerical value of the encounter probability expressed as a percentage may be multiplied without any modification. For example, as illustrated in FIG. 9, in Lane 1 of Road Section 0001, the encounter probability of Risk A (risk potential is 100) is 66%, the encounter probability of Risk B (risk potential is 80) is 100%, and the encounter probability of Risk C (risk potential is 50) is 0%; therefore, the primary estimated risk potential is calculated as 100×66%+80×100%+50×0%=14600. Likewise, as illustrated in FIG. 9, in Lane 1 of Road Section 0002, the encounter probability of Risk A (risk potential is 100) is 100%, the encounter probability of Risk B (risk potential is 80) is 0%, and the encounter probability of Risk C (risk potential is 50) is 0%; therefore, the primary estimated risk potential is calculated as 100×100%+80×0%+50×0%=10000. Thus, the primary estimated risk potential obtained from the risk potential and the encounter probability is a value equal to or less than the risk potential.

When obtaining the value of the primary estimated risk potential, the avoidance time required to avoid a detected object may be accumulated for each classification of the detected object, and the primary estimated risk potential may be weighted with the ratio of the avoidance time for each classification. For example, provided that an object that blocks a lane for a long time is classified as having Risk A (=100), an object that temporarily blocks a lane is classified as having Risk B (=80), an object that obstructs a traffic flow is classified as having Risk C (=50), and an object that partially obstructs a traffic flow is classified as having Risk D (=20), when the average time required to avoid each of the objects classified as having Risks A, B, C, and D is 10 minutes, 5 minutes, 1 minute, or 0.5 minutes, respectively, the primary estimated risk potential may be obtained through multiplying the risk potentials of Risks A, B, C, and D by respective encounter probabilities, multiplying these multiplied risk potentials by 10, 5, 1, and 0.5 as weights, respectively, and then adding them.

Additionally or alternatively, when obtaining the value of the primary estimated risk potential, the encounter probability at each traveling position may be obtained by extracting, from among the information items stored in the storage unit 1604, a time slot including the time when traveling from the current position P1 to the destination Px. Likewise, when obtaining the value of the primary estimated risk potential, the encounter probability at each traveling position may be obtained by extracting, from among the information items stored in the storage unit 1604, information on a common attribute of the date when traveling from the current position P1 to the destination Px. Likewise, when obtaining the value of the primary estimated risk potential, the encounter probability at each traveling position may be obtained by extracting, from among the information items stored in the storage unit 1604, information on a common operating situation of wipers when traveling from the current position P1 to the destination Px.

A method of obtaining the secondary estimated risk potential will then be described. The secondary estimated risk potential generation unit 1609 obtains a secondary estimated risk potential lower than the primary estimated risk potential using a predicted travel movement of another vehicle that avoids the risk due to the primary estimated risk potential. Here, the risk due to the primary estimated risk potential refers to a risk identified by the risk potential and the encounter location which are used when the primary estimated risk potential generation unit 1608 obtains the primary estimated risk potential. That is, the risk potential corresponds to the classified risk (e.g., any of Risks A to D), and it is therefore possible to perceive what kind of risk is encountered at which position on the travel route R from the risk potential and the encounter location. The predicted travel movement of the present embodiment refers to a travel movement which, when a vehicle traveling encounters a risk that hinders the travel, such as another vehicle stopped in the left lane or a traffic congestion of waiting for a right or left turn, the vehicle is predicted to take in order to avoid the risk and continue traveling. How to predict the travel movement will be described below by exemplifying a predicted travel movement in the travel scene illustrated in FIG. 7.

Figure 10:
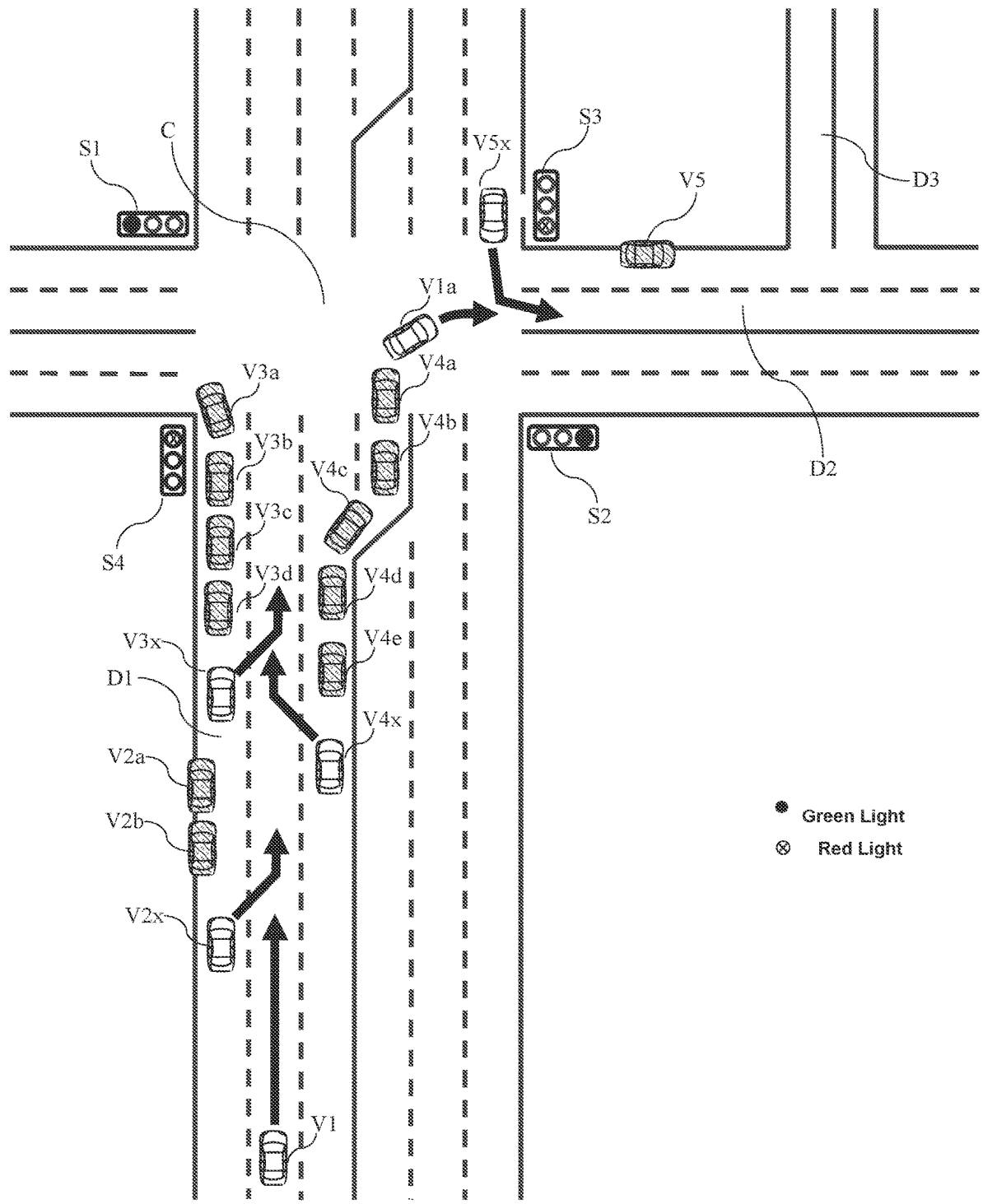
FIG. 10 is a plan view illustrating an example of a predicted travel movement of another vehicle that avoids a risk due to a primary estimated risk potential in the traffic situation illustrated in FIG. 7.

FIG. 10 is a plan view illustrating an example of the predicted travel movement of another vehicle that avoids a risk due to the primary estimated risk potential in the travel scene illustrated in FIG. 7. In FIG. 10, as in the travel scene illustrated in FIG. 7, it is assumed that there are other vehicles V2a and V2b that are stopped in the left lane of the road D1, four other vehicles V3a to V3d that are lined up in the left lane of the road D1 to wait for the left turn at the intersection C, five other vehicles V4a to V4e that are waiting for the right turn in the right lane and right-turn-only lane of the road D1, and another vehicle V5 that is stopped in the left lane of the road D2. These vehicles correspond to the risks due to the primary estimated risk potential. It is also assumed that there are another vehicle V2x that travels behind the other vehicles V2a and V2b, still another vehicle V3x that travels behind the other vehicles V3a to V3d, and yet another vehicle V4x that travels behind the other vehicles V4a to V4e and the other vehicles V2x, V3x, and V4x are traveling along routes for traveling straight through the intersection C.

In this travel scene, the other vehicle V2x which travels in the left lane of the road D1 cannot continue traveling in the left lane because of encounter with the other vehicles V2a and V2b which are stopped. Therefore, as illustrated in FIG. 10, for example, the other vehicle V2x is predicted to change lanes behind the stopped other vehicle V2b from the left lane of the road D1 to the center lane in order to avoid the stopped other vehicles V2a and V2b and continue traveling. That is, in this case, the predicted travel movement of the other vehicle V2x which avoids the risk is a lane change behind the stopped other vehicle V2b from the left lane of the road D1 to the center lane.

Also in the above travel scene, the other vehicle V3x which travels behind the other vehicle V3d encounters the traffic congestion of the other vehicles V3a to V3d which wait for the left turn at the intersection C, and in order to continue traveling in the left lane, the other vehicle V3x has to wait behind the other vehicle V3d until the traffic congestion of waiting for the left turn is cleared. Therefore, as illustrated in FIG. 10, for example, the other vehicle V3x is predicted to change lanes behind the other vehicle V3d from the left lane of the road D1 to the center lane in order to avoid the traffic congestion of the other vehicles V3a to V3d and continue traveling without waiting for the traffic congestion to be cleared. That is, in this case, the predicted travel movement of the other vehicle V3x which avoids the risk is a lane change behind the other vehicle V3d from the left lane of the road D1 to the center lane.

Likewise, in the above travel scene, the other vehicle V4x which travels behind the other vehicle V4e encounters the traffic congestion of the other vehicles V4a to V4e which wait for the right turn at the intersection C, and in order to continue traveling in the right lane, the other vehicle V4x has to wait behind the other vehicle V4e until the traffic congestion of waiting for the right turn is cleared. Therefore, as illustrated in FIG. 10, for example, the other vehicle V4x is predicted to change lanes behind the other vehicle V4e from the right lane of the road D1 to the center lane in order to avoid the traffic congestion of the other vehicles V4a to V4e and continue traveling without waiting for the traffic congestion to be cleared. That is, in this case, the predicted travel movement of the other vehicle V4x which avoids the risk is a lane change behind the other vehicle V4e from the right lane of the road D1 to the center lane.

Here, in FIG. 10, it is assumed that the subject vehicle V1 is traveling straight ahead in the center lane of the road D1. If the other vehicles V2x, V3x, and V4x change lanes from the left or right lane to the center in accordance with the predicted travel movement, the other vehicles V2x, V3x, and V4x will enter the center lane, in which the subject vehicle V1 is traveling, ahead in the traveling direction of the subject vehicle V1. That is, the subject vehicle V1 may be interrupted ahead in the center lane, in which the subject vehicle V1 travels, by the other vehicles V2x, V3x, and V4x avoiding the other vehicles V2a and V2b which are stopped, the traffic congestion of the other vehicles V3a to V3d which are waiting for the left turn, and the traffic congestion of the other vehicles V4a to V4e which are waiting for the right turn, respectively. The secondary estimated risk potential generation unit 1609 perceives the possibility of being interrupted by each of the other vehicles V2x, V3x, and V4x as a risk and calculates the secondary estimated risk potential based on the risk.

When the risk of being interrupted by the other vehicle V2x or the like is arranged as the secondary estimated risk potential in a predicted risk map, the position at which the secondary estimated risk potential is arranged is located behind the location at which the risk is encountered, for example, in an adjacent lane to the lane corresponding to the encounter location with the risk of the primary estimated risk potential. As an example, in the case of the risk of being interrupted by the other vehicle V2x illustrated in FIG. 10, the location at which the other vehicle V2x encounters the risk is the location behind the other vehicle V2b which is stopped in the left lane of the road D1. Then, the lane corresponding to the location behind the other vehicle V2b, that is, the lane adjacent to the left lane of the road D1, is the center lane of the road D1. In this case, therefore, the secondary estimated risk potential derived from the travel movement of avoiding the other vehicles V2a and V2b which are stopped is arranged in the center lane of the road D1 behind the other vehicle V2b.

In the case of the risk of being interrupted by the other vehicle V3x illustrated in FIG. 10, the location at which the other vehicle V3x encounters the risk is the location behind the other vehicle V3d which is the end of the traffic congestion of waiting for the left turn on the road D1. Then, the lane corresponding to the location behind the other vehicle V3d, that is, the lane adjacent to the left lane of the road D1, is the center lane of the road D1. In this case, therefore, the secondary estimated risk potential derived from the travel movement of avoiding the traffic congestion of the other vehicles V1a to V3d which are waiting for the left turn is arranged in the center lane of the road D1 behind the other vehicle V3d. Likewise, in the case of the risk of being interrupted by the other vehicle V4x illustrated in FIG. 10, the location at which the other vehicle V4x encounters the risk is the location behind the other vehicle V4e which is the end of the traffic congestion of waiting for the right turn on the road D1. Then, the lane corresponding to the location behind the other vehicle V4e, that is, the lane adjacent to the right lane of the road D1, is the center lane of the road D1. In this case, therefore, the secondary estimated risk potential derived from the travel movement of avoiding the traffic congestion of the other vehicles V4a to V4e which are waiting for the right turn is arranged in the center lane of the road D1 behind the other vehicle V4e.

The description will then be made for still another vehicle V5x illustrated in FIG. 10. It is assumed that, unlike the other vehicles V2x, V3x, and V4x, the other vehicle V5x turns left at the intersection C and the other vehicle V5 stopped on the left side is present in the lane into which the other vehicle V5x turns left. In this case, if the other vehicle V5x enters the left lane of the left-turn destination lanes, the other vehicle V5x will encounter the stopped other vehicle V5 and cannot continue traveling in the left lane. In addition, to continue traveling, the other vehicle V5x has to change lanes from the left lane to the right lane of the road D2 behind the stopped other vehicle V5. Therefore, to avoid the stopped other vehicle V5 before the left turn rather than after the left turn and continue traveling without changing lanes after the left turn, as illustrated in FIG. 10, for example, the other vehicle V5x is predicted to enter the right lane of the left-turn destination lanes. That is, the predicted travel movement of the other vehicle V5x which avoids the risk is the entry into the right lane of the road D2 when turning left.

Here, in FIG. 10, it is assumed that a subject vehicle V1a is about to turn right at the intersection C. If the other vehicle V5x enters the right lane of the road D2 when turning left in accordance with the predicted travel movement, the other vehicle V5x will enter ahead of the subject vehicle V1 while the subject vehicle V1 is turning right at the intersection C. That is, while turning right at the intersection C, the subject vehicle V1 may be interrupted ahead by the other vehicle V5x which avoids the stopped other vehicle V5. The secondary estimated risk potential generation unit 1609 perceives the possibility of being interrupted by the other vehicle V5x as a risk and calculates the secondary estimated risk potential based on the risk.

When the risk of being interrupted by the other vehicle V5x at the intersection C is arranged as the secondary estimated risk potential in the predicted risk map, the position at which the secondary estimated risk potential is arranged is, for example, in an area in which the other vehicle V5x travels in the intersection C. Alternatively or in addition to this, provided that the subject vehicle V1a turns right, when the intersection C is located behind the primary estimated risk potential arranged in the lane after the right turn with respect to the traveling direction of the subject vehicle V1a, the position at which the secondary estimated risk potential is arranged is, for example, the rightmost lane in which the primary estimated risk potential exists among the lanes after the right turn. In the travel scene illustrated in FIG. 10, the stopped other vehicle V5 is present in the left lane of the road D2 after the right turn, and the intersection C exists behind the subject vehicle V1a, which turns right, with respect to the traveling direction of the subject vehicle V1a. In this case, the secondary estimated risk potential is arranged in the right lane of the road D2. Alternatively or in addition to the right lane of the road D2 in which the subject vehicle V1 travels after turning right at the intersection C, among the lanes in the intersection C in which the subject vehicle V1 may travel while turning right (referred to as "lanes during the right turn"), the lane in which the primary estimated risk potential does not exist may be arranged with the secondary estimated risk potential.

Here, when the road D2 after the right turn includes three or more lanes, there are two or more lanes other than the lane in which the primary estimated risk potential exists, that is, two or more lanes in which the secondary estimated risk potential can be arranged. In this case, the secondary estimated risk potential may be arranged in the lane closest to the primary estimated risk potential among the lanes other than the lane in which the primary estimated risk potential exists. For example, in the travel scene illustrated in FIG. 10, when the road D2 includes a left lane, a center lane, and a right lane, the secondary estimated risk potential is arranged in the center lane of the road D2. Additionally or alternatively, the risk may be increased from the lane with the secondary estimated risk potential close to the primary estimated risk potential, among the secondary estimated risk potentials arranged in two or more lanes, with respect to the traveling direction of the subject vehicle Vla. For example, in the travel scene illustrated in FIG. 10, when the road D2 includes a left lane, a center lane, and a right lane, the secondary estimated risk potential is arranged in the center lane and the right lane, and the secondary estimated risk potential of the center lane close to the primary estimated risk potential of the left lane may be set larger than the secondary estimated risk potential of the right lane.

In the travel scene illustrated in FIG. 10, the subject vehicle V1*a* is assumed to turn right, but also when the subject vehicle V1*a* turns left, the secondary estimated risk potential can be arranged at the same position as that when the subject vehicle V1*a* turns right. That is, provided that the subject vehicle V1 turns left, when the intersection C is located behind the primary estimated risk potential arranged in the lane after the left turn with respect to the traveling direction of the subject vehicle V1, the secondary estimated risk potential is arranged in a lane other than the leftmost lane in which the primary estimated risk potential exists among the lanes after the left turn. For example, in FIG. 10, it is assumed that the subject vehicle V1 turns left from the position of the other vehicle V5*x* along the same travel route R as that of the other vehicle V5*x* and the other vehicle V5*x* turns right at the intersection C from the position of the subject vehicle V1*a*. In this case, the intersection C exists behind the subject vehicle V1 after the left turn with respect to the traveling direction of the subject vehicle V1, and the stopped other vehicle V5 is present in the left lane of the road D2 after the left turn. Therefore, the secondary estimated risk potential is arranged in a lane other than the left lane, which is the left lane of the road D2, that is, in the right lane. Here, two or more secondary estimated risk potentials may be set in accordance with the number of lanes after the left turn. In this case, as in the case of right turn described above, the risk may be increased from the lane with the secondary estimated risk potential close to the primary estimated risk potential, among the secondary estimated risk potentials arranged in two or more lanes, with respect to the traveling direction of the subject vehicle V1. Additionally or alternatively, the secondary estimated risk potential may be arranged in the lane closest to the primary estimated risk potential among the two or more lanes. Alternatively or in addition to the right lane of the road D2 in which the subject vehicle V1 may travel after turning left at the intersection C, among the lanes in the intersection C in which the subject vehicle V1 travels while turning left (referred to as "lanes during the left turn"), the lane in which the primary estimated risk potential does not exist may be arranged with the secondary estimated risk potential.

The position of arranging the secondary estimated risk potential when turning right or left described above is on the assumption that the road is left-side traffic. When the road is right-side traffic, the right and left are to be read symmetrically in the above description, and the position of arranging the secondary estimated risk potential is set symmetrically with respect to the case of left-side traffic.

When arranging the secondary estimated risk potential on the predicted risk map, it is necessary to calculate the magnitude in addition to the position. Here, the value of the secondary estimated risk potential is derived from the travel movement for avoiding the risk due to the primary estimated risk potential and can therefore be calculated by using the value of the primary estimated risk potential. The magnitude of the secondary estimated risk potential can be calculated, for example, as a value obtained by multiplying the value of the primary estimated risk potential corresponding to the risk to be avoided by a predetermined value (e.g., 0.8). The predetermined value may be changed in accordance with the classification of risk, for example, 0.8 when the risk to be avoided is classified as Risk A, 0.6 when the risk to be avoided is classified as Risk B, 0.4 when the risk to be avoided is classified as Risk C, or 0.2 when the risk to be avoided is classified as Risk D. For example, as illustrated in FIG. 9, the primary estimated risk potential of Lane 1 of Road Section 0001 is calculated as 100×66%+80×100%+50×0%=14600. In this case, the secondary estimated risk potential of Lane 2 of Road Section 0001 is calculated, for example, as 100×66%×0.8+80×100%×0.6+50×0%×0.4=10080. Alternatively or in addition to this, the magnitude of the secondary estimated risk potential may be increased in proportion to the magnitude of the primary estimated risk potential corresponding to the risk to be avoided. When the primary estimated risk potential and the secondary estimated risk potential are due to the same risk, the value of the secondary estimated risk potential is smaller than the value of the primary estimated risk potential because the former is obtained by multiplying the primary estimated risk potential by a predetermined coefficient.

Additionally or alternatively, like the primary estimated risk potential, the secondary estimated risk potential may be obtained for each lane of each road section divided in the extending direction of the road. The secondary estimated risk potential is obtained for each road section divided, for example, by 100 m with respect to the extending direction of the road, and for a road having a plurality of lanes, it is obtained for each lane. In a second adjacent lane that is adjacent to the adjacent lane in which the secondary estimated risk potential is arranged, the secondary estimated risk potential may be used to obtain a tertiary or higher predicted risk potential.

Figure 11:
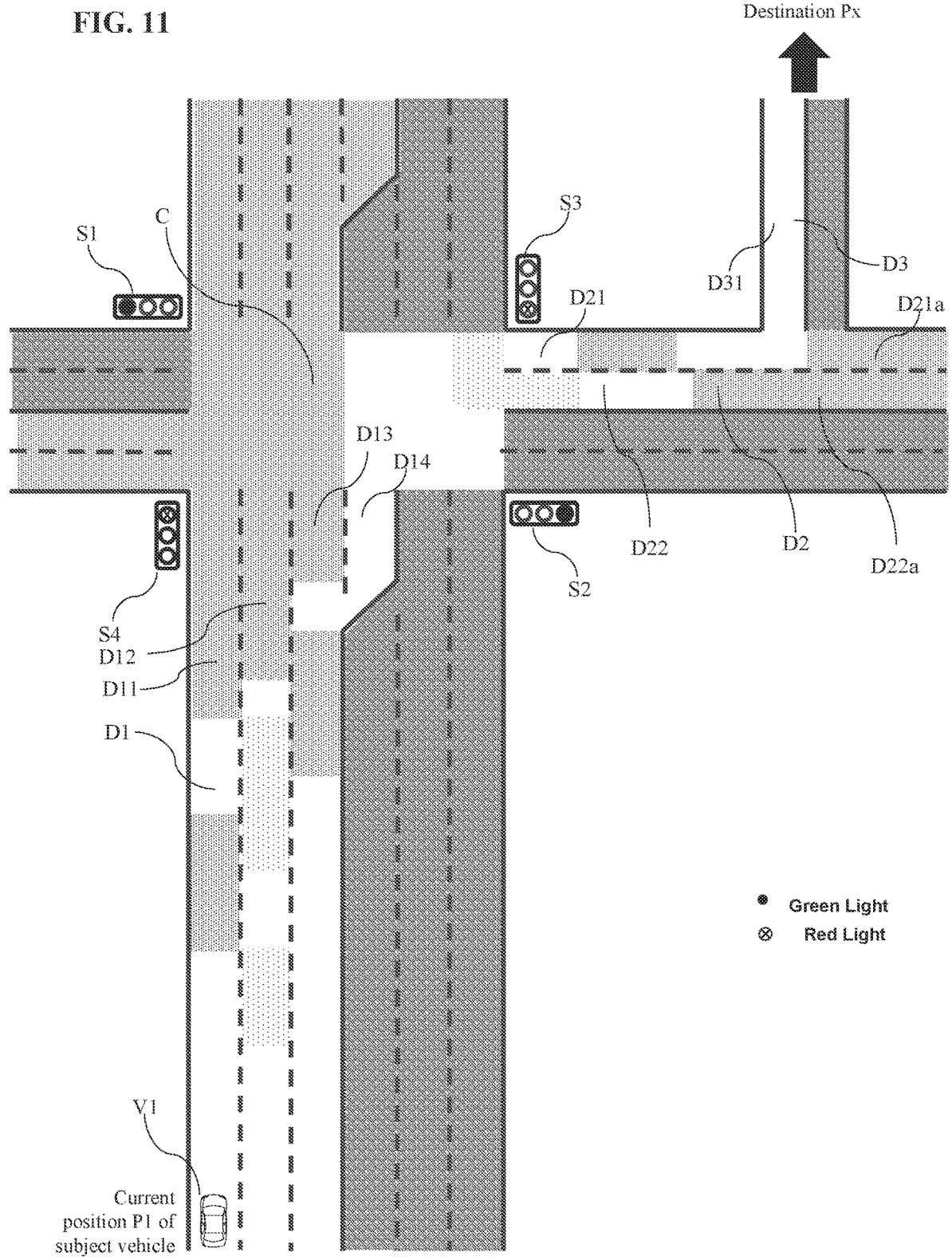
FIG. 11 is a plan view illustrating an example of a predicted risk map generated by the predicted risk map generation unit of FIG. 3 for the travel route of FIG. 6.

As described above, in the predicted risk map generation unit 1605, the primary estimated risk potential and the secondary estimated risk potential for each traveling position are obtained, and the predicted risk map is generated, in which the primary estimated risk potential and the secondary estimated risk potential are laid out in the map information. FIG. 11 is a plan view illustrating an example of the predicted risk map generated by the predicted risk map generation unit 1605 of FIG. 3 for the travel route R of FIG. 6. FIG. 11 illustrates that the darker the color attached to the lane, the larger the primary and secondary estimated risk potentials. The darkest colored travel route is the oncoming lane, which indicates that the subject vehicle V1 cannot travel.

The travel routes which are not the oncoming lanes and along which the subject vehicle V1 can travel include a travel route with the second darkest color, a travel route with the third darkest color, and a travel route with no color. For example, in a left lane D11 of the road D1, the traffic congestion of the other vehicles V3a to V3d which are waiting for the left turn frequently occurs, so that the primary estimated risk potential obtained by the primary estimated risk potential generation unit 1608 is a large value, and the second darkest color is therefore attached to the position at which the traffic congestion occurs. Furthermore, in the left lane D11 of the road D1, the other vehicles V2a and V2b are frequently parked on the road shoulder, so that the primary estimated risk potential obtained by the primary estimated risk potential generation unit 1608 is a large value, and the second darkest color is therefore attached to the stop positions on the road shoulder. Likewise, in a right lane D13 of the road D1, the traffic congestion of the other vehicles V4a to V4e which are waiting for the right turn frequently occurs, so that the primary estimated risk potential obtained by the primary estimated risk potential generation unit 1608 is a large value, and the second darkest color is therefore attached to the position at which the traffic congestion occurs. In addition, in a left lane D21 of the road D2, a parked vehicle is frequently present, so that the primary estimated risk potential obtained by the primary estimated risk potential generation unit 1608 is a large value, and the second darkest color is therefore attached.

On the other hand, as for a center lane D12 of the road D1, the primary estimated risk potential related to a detected object is small. However, a portion of the center lane D12 near the intersection C has a large risk potential in the sense that the subject vehicle V1 has to change lanes to a right-turn-only lane D14, and the second darkest color is therefore attached. Likewise, a portion of the right lane D13 near the intersection C has a large risk potential in the sense that the subject vehicle V1 has to change lanes to the right-turn-only lane D14, and the second darkest color is therefore attached. In addition to this, in the center lane D12 of the road D1, the third darkest color is attached behind the second darkest colors corresponding to the primary estimated risk potential, which are attached to the left lane D11 and the right lane D13. This is because the secondary estimated risk potential obtained by the secondary estimated risk potential generation unit 1609 is a large value.

As for a right lane D22 of the road D2, the primary estimated risk potential related to a detected object is small. However, a portion D22a of the right lane D22 near the branching point to a road D3 has a large risk potential in the sense that the subject vehicle V1 has to change lanes to the left lane, and the second darkest color is therefore attached. A portion D21a of the road D2 after passing through the branch point to the road D3 also has a large risk potential in the sense that the subject vehicle V1 has to change lanes to the left lane, and the second darkest color is therefore attached. In addition to this, in the right lane D22 of the road D2, the third darkest color is attached behind the second darkest color corresponding to the primary estimated risk potential, which is attached to the left lane D21 of the road D2. This third darkest color attached to the right lane D22 extends into the intersection C. This is because when a left-turn vehicle V5x that faces the subject vehicle V1a turning right is present, there is a risk that the subject vehicle V1a is interrupted ahead while turning right and therefore the secondary estimated risk potential obtained by the secondary estimated risk potential generation unit 1609 is a large value.

Figure 12:
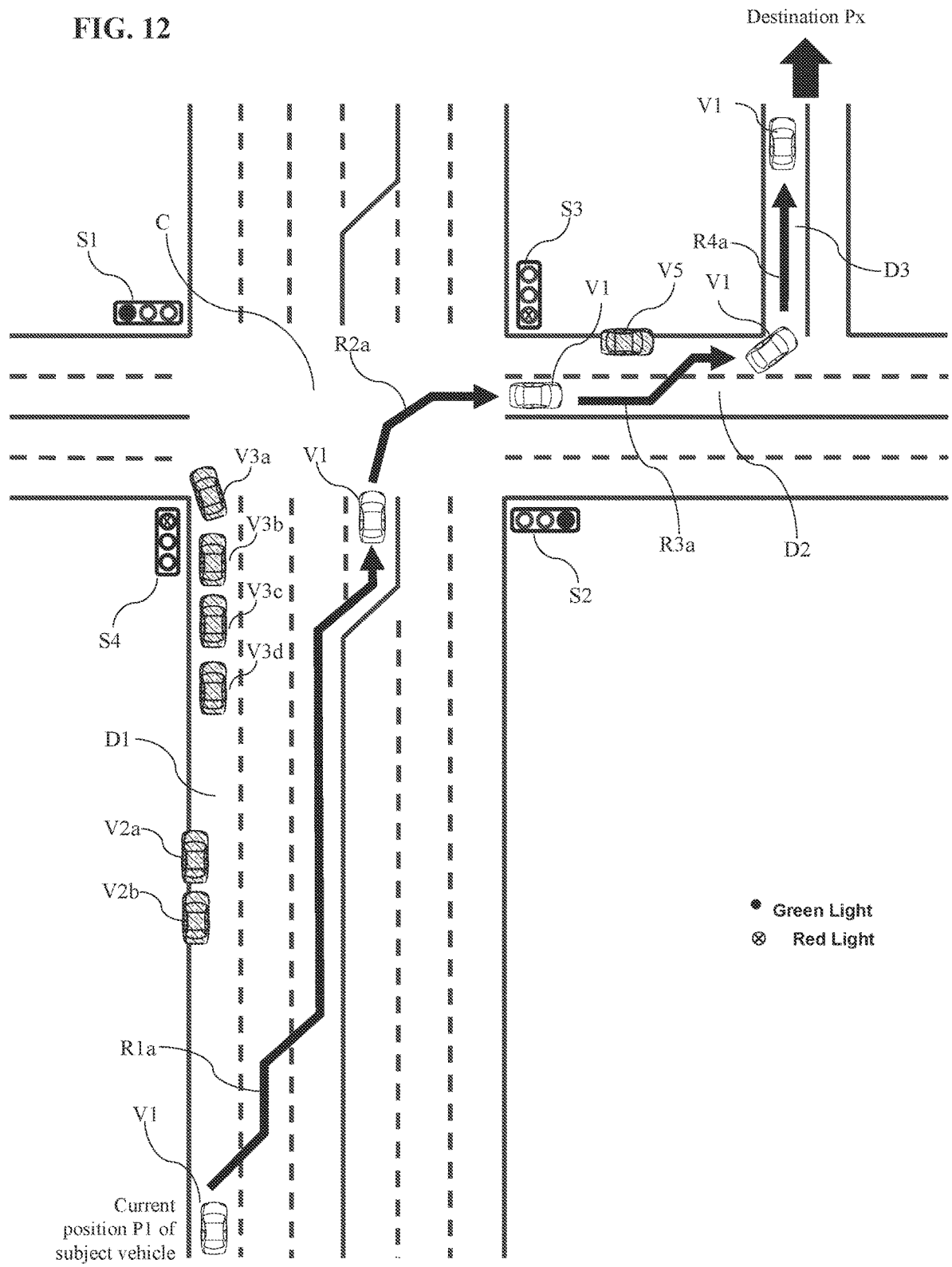
FIG. 12 is a plan view illustrating an example of a final travel route determined by an action determining unit of FIG. 3 for the travel route of FIG. 6.
Figure 14:
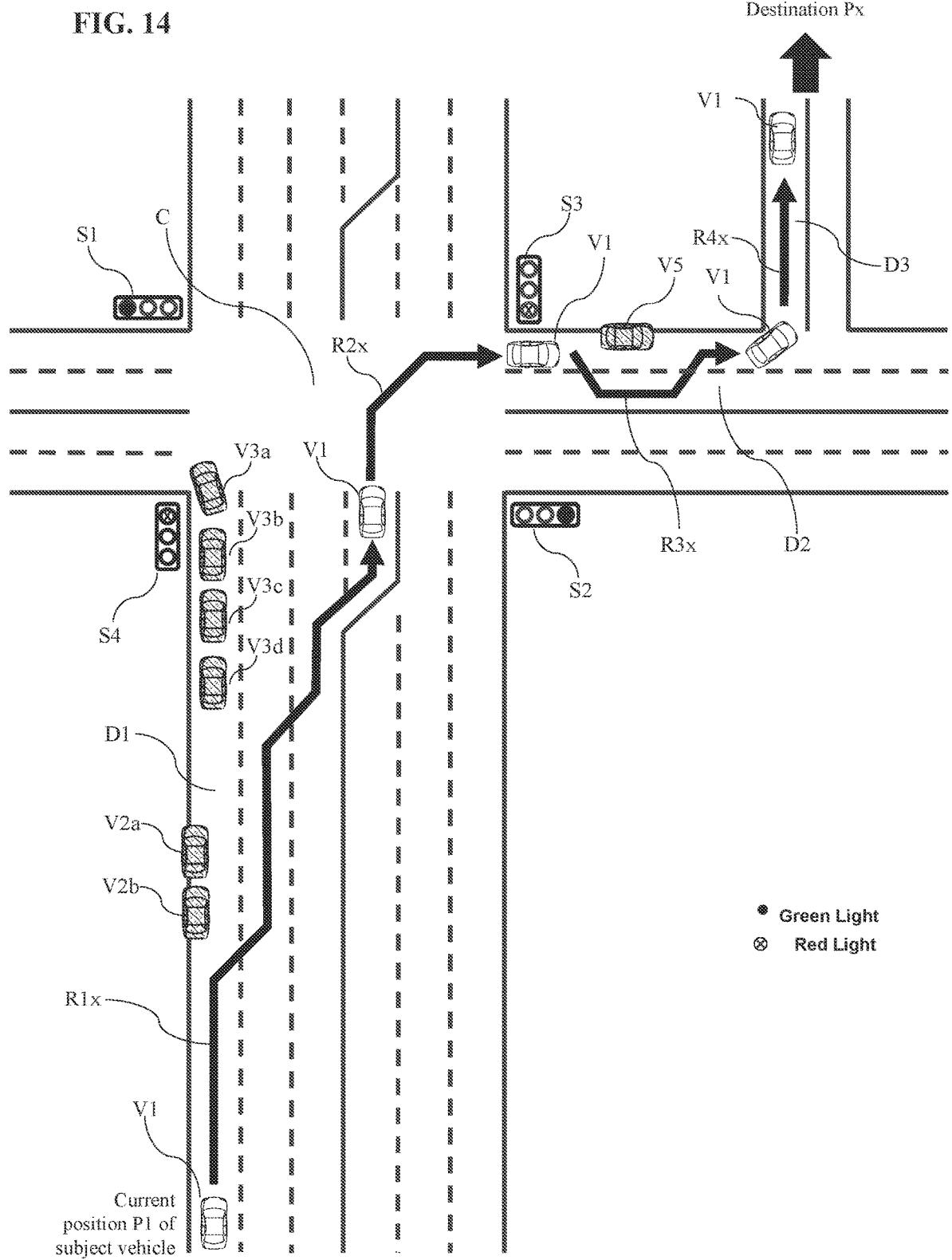
FIG. 14 illustrates a comparative example with respect to the embodiment of FIG. 12 and is a plan view illustrating a final travel route determined by using only an actualized risk map of FIG. 3.

The action determination unit 1613 of FIG. 3 refers to the predicted risk map illustrated in FIG. 11 and selects a travel route having the smallest risk potential when traveling along the travel route R1→R2→R3→R4 of FIG. 6. Here, when traveling along the travel route R1→R2→R3→R4 of FIG. 6, it is not necessary to travel in the vicinity of the traveling position (near the encounter location with the detected object), that is, in the same lane, and the case of traveling on the same road is included. The primary estimated risk potential and the secondary estimated risk potential are calculated at least before traveling at the traveling position (the encounter location with the detected object). FIG. 12 illustrates a final travel route R1a→R2a→R3a→R4a that is thus set in consideration of the primary and secondary estimated risk potentials. On the other hand, FIG. 14 illustrates a travel route R1x→R2x→R3x→R4x according to a comparative example that is set under the condition of the current position P1 to the destination Px without considering the primary estimated risk potential or the secondary estimated risk potential. FIG. 12 is a plan view illustrating a final travel route Ra that is determined by the action determination unit 1613 of FIG. 3 for the travel route R of FIG. 6, and FIG. 14 illustrates a comparative example with respect to the embodiment of FIG. 12 and is a plan view illustrating a final travel route Rx that is determined by using only an actualized risk map obtained by the actualized risk map generation unit 1611 of FIG. 3.

Comparing the travel route Ra according to the embodiment of the present invention of FIG. 12 with the travel route Rx according to the comparative example for the present invention of FIG. 14, first, the timing of changing lanes from the current position P1 of the subject vehicle V1 to the center lane, the right lane, and the right-turn-only lane before the intersection C is different. That is, in the comparative example illustrated in FIG. 14, the travel route R1x for changing lanes at the usual timing of changing lanes is set based on the vehicle speed of the subject vehicle V1 and the distance or time required for changing lanes; therefore, in some cases, the subject vehicle V1 may stop behind the other vehicle V2b, which is stopped in the left lane of road D1, until the lane change of a following vehicle that has already started changing lanes is completed, or the subject vehicle V1 may follow the rearmost other vehicle V3d of the traffic congestion which occurs in the left lane of road D1 for waiting for the left turn.

On the other hand, in the embodiment illustrated in FIG. 12, the stopped other vehicles V2a and V2b, which are likely to be present in the left lane of the road D1, and the traffic congestion of waiting for the left turn, which is likely to occur, are predicted because the primary estimated risk potential illustrated as D11 of FIG. 11 is high, and the set travel route R1a is therefore a route for changing lanes to the center lane before the traffic congestion in the left lane of the road D1. Furthermore, in the embodiment illustrated in FIG. 12, the risk of being interrupted by another vehicle due to the stopped other vehicles V2a and V2b, which are likely to be present in the left lane of the road D1, and due to the traffic congestion of waiting for the left turn, which is likely to occur, is predicted because the secondary estimated risk potential illustrated as D12 of FIG. 11 is high, and the set travel route R1a is a route along which the other vehicle V2x avoiding the stopped other vehicles V2a and V2b changes lanes from the center lane to the right lane and which is in a direction of avoiding the secondary estimated risk potential before entering the center lane from the left lane due to the lane change. This allows the subject vehicle to smoothly change lanes to the right-turn-only lane without stopping behind the other vehicle V2b, which is stopped in the left lane of road D1, until the lane change of a following vehicle that has already started changing lanes is completed, or following the rearmost other vehicle V3d of the traffic congestion which occurs in the left lane of road D1 for waiting for the left turn.

Another difference when comparing the travel route Ra according to the embodiment of the present invention of FIG. 12 with the travel route Rx according to the comparative example for the present invention of FIG. 14 is a method of entering the road D2 after turning right at the intersection C. In the comparative example illustrated in FIG. 14, the subject vehicle first enters the left lane of the road D2 after turning right at the intersection C because the subject vehicle is set to travel in the left lane as a general rule when traveling on a road. However, the parked vehicle V5 is present ahead and the subject vehicle therefore follows a travel route R3x so as to once change lanes to the right lane in order to avoid the parked vehicle V5 and then change lanes to the left lane again.

On the other hand, in the embodiment illustrated in FIG. 12, the high possibility that the parked vehicle V5 is present in the left lane of the road D2 is predicted by the primary estimated risk potential illustrated as D21 of FIG. 11 being high, and the set travel route R3a is therefore a travel route along which the subject vehicle turns right at the intersection C, then directly enters the right lane of the road D2, then overtakes the parked vehicle in the left lane, and then changes lanes to the left lane. This eliminates the need of changing lanes from the left lane to the right lane on the road D2.

In general, a vehicle in which travel assistance control such as autonomous driving is executed for traveling is controlled to travel using sensors provided in the vehicle to travel with the use of information detected by the sensors. Therefore, information obtained by the sensors and highly accurate information of the information obtained by the sensor, such as information on a short range from the subject vehicle, for example, are used and the information that can be used for the travel assistance control is limited. However, fortunately, in the embodiment illustrated in FIG. 12, the primary and secondary estimated risk potentials are used as information that is not obtained by the sensors and/or as information that complements the information obtained by the sensors, leading to predicting the situation at a position far from the subject vehicle, for example, to preliminarily change lanes and selecting the optimum travel lane.

Referring again to FIG. 3, the route calculation unit 160 of the present embodiment further includes the actualized risk map learning unit 1610, the actualized risk map generation unit 1611, and the risk map integration unit 1612. The actualized risk map learning unit 1610 generates a trajectory inducing potential for generating an actualized risk map.

When a human driver sees an object such as a parked vehicle in the traffic environment, the driver thinks of what to do to handle the object or which route to pass through rather than how far away from the object to take a distance. To simulate such a mechanism, the actualized risk map learning unit 1610 generates from the driving data a trajectory inducing potential for displaying the actualized risk map. That is, the trajectory inducing potential is generated in real time for each classification of each object actually detected, such as, for example, a vehicle, a pedestrian, or a bicycle. This includes a repulsive space potential for collision prevention, an attractive space potential for inducing a desired trajectory, and a speed potential for inducing an appropriate target speed. Furthermore, when a probe car deals with various traffic participants in each category, their trajectories are learnt with natural driving data. In online processing, the trajectory inducing potential is used to calculate a desired local trajectory and a target speed profile.

On the basis of the trajectory inducing potential obtained from the actualized risk map learning unit 1610, which is preliminarily learnt for each classification, and the classification result of the traffic participants around the subject vehicle, the actualized risk map generation unit 1611 applies the trajectory inducing potential to each traffic participant around the subject vehicle in accordance with the classification to generate the actualized risk map. The predicted risk map generated by the predicted risk map generation unit 1605 is obtained by predicting the risk potential based on the past experience using the characteristic value of the encounter probability, whereas the actualized risk map generated by the actualized risk map generation unit 1611 is obtained by calculating the risk potential for an object detected when actually traveling on a travel route. This allows appropriate travel assistance to be executed based on the actualized risk potential when an object is incidentally or suddenly detected in a road section or lane in which the primary estimated risk potential and the secondary estimated risk potential are low, such as due to a low encounter probability with the detected object. When the actualized risk potential and the primary estimated risk potential are due to the same risk, the actualized risk potential calculated for the detected risk is larger than the primary estimated risk potential for the risk. This is because the primary estimated risk potential is the risk potential predicted by using the characteristic value of the encounter probability for the risk potential.

Then, the risk map integration unit 1612 generates an integrated risk map in which the predicted risk map generated by the predicted risk map generation unit 1605 and the actualized risk map generated by the actualized risk map generation unit 1611 are integrated. Specifically, the risk map integration unit 1612 detects an object around the subject vehicle when actually driving the subject vehicle and, upon the detection of an object such as an obstacle, obtains the actualized risk potential of the object detected by the actualized risk map generation unit 1611. Then, the primary estimated risk potential and the secondary estimated risk potential are compared with the actualized risk potential, and the integrated risk map is generated based on the larger risk potential so as to assist the travel of the vehicle, such as setting the lane in which the subject vehicle V1 travels.

The avoidance vehicle detection unit 1614 and the avoidance vehicle risk potential generation unit 1615 illustrated in FIG. 3 will then be described. When actually traveling along the travel route Ra, the avoidance vehicle detection unit 1614 uses the information regarding the surrounding objects, which is transmitted from the surrounding object trajectory acquisition unit 1601, to detect another vehicle that avoids the risk due to the primary estimated risk potential. For example, in the travel scene illustrated in FIG. 10, the avoidance vehicle detection unit 1614 detects, from the information on the objects which the surrounding object trajectory acquisition unit 1601 detects using the sensors 1 such as a camera and a ranging sensor, the other vehicle V2x which avoids the stopped other vehicles V2a and V2b, the other vehicle V3x which avoids the traffic congestion of the other vehicles V3a to V3d waiting for the left turn, the other vehicle V4x which avoids the traffic congestion of the other vehicles V4a to V4e waiting for the right turn, and the other vehicle V5x which turns left to enter the right lane of the road D2.

The avoidance vehicle risk potential generation unit 1615 calculates the risk potential derived from another vehicle that avoids the risk related to the primary estimated risk potential. The other vehicle is detected when actually traveling along the travel route Ra. For example, in the travel scene illustrated in FIG. 10, when the avoidance vehicle detection unit 1614 actually detects, during the travel, the other vehicle V2x which avoids the stopped other vehicles V2a and V2b, the avoidance vehicle risk potential generation unit 1615 calculates the avoidance vehicle risk potential derived from the actually detected other vehicle V2x, which is higher than the secondary estimated risk potential corresponding to the primary estimated risk potential due to the stopped other vehicles V2a and V2b.

The secondary estimated risk potential generation unit 1609 obtains the secondary estimated risk potential using the predicted travel movement regardless of whether or not there is the other vehicle which avoids the risk. On the other hand, the avoidance vehicle risk potential generation unit 1615 obtains the avoidance vehicle risk potential, which is higher than the secondary estimated risk potential, when the avoidance vehicle detection unit 1614 actually detects the other vehicle which avoids the risk due to the primary estimated risk potential. Thus, by using the secondary estimated risk potential and the avoidance vehicle risk potential, it is possible to further avoid any risk that may arise as compared with when only the secondary estimated risk potential is used.

The avoidance vehicle risk potential is obtained by using the predicted travel movement of another vehicle that avoids the risk due to the primary estimated risk potential as in the case of the secondary estimated risk potential. Therefore, the position at which the avoidance vehicle risk potential is arranged is, for example, the same position as that for the secondary estimated risk potential corresponding to the primary estimated risk potential. Alternatively or in addition to this, the position at which the avoidance vehicle risk potential is arranged may be located behind the location at which the risk due to the primary estimated risk potential is encountered in an adjacent lane to the lane corresponding to the location at which the risk is encountered.

Additionally or alternatively, the magnitude of the avoidance vehicle risk potential can be calculated, when the avoidance vehicle detection unit 1614 actually detects the other vehicle which avoids the risk due to the primary estimated risk potential, for example, by weighting the secondary estimated risk potential corresponding to the primary estimated risk potential. For example, when the primary estimated risk potential is calculated as $100\times66\%+80\times100\%+50\times0\%=14600$ in Lane 1 of Road Section 0001 of FIG. 9 and the secondary estimated risk potential is calculated as $100\times66\%\times0.8+80\times100\%\times0.6+50\times0\%\times0.4=10080$ in Lane 2 of Road Section 0001, the avoidance vehicle risk potential in Lane 2 of Road Section 0001 is calculated as $10080\times1.5=15120$, for example, by multiplying the secondary estimated risk potential by 1.5.

The calculated avoidance vehicle risk potential can be integrated into the risk map. For example, the risk map integration unit 1612 reflects the avoidance vehicle risk potential in the predicted risk map, which is generated by the predicted risk map generation unit 1605, and then integrates it with the actualized risk map, which is generated by the actualized risk map generation unit 1611, to generate the integrated risk map. The risk map integration unit 1612 compares the primary estimated risk potential, the secondary estimated risk potential, the actualized risk potential, and the avoidance vehicle risk potential with one another and generates, based on the highest risk potential, the integrated risk map so as to assist the travel of the vehicle, such as setting the lane in which the subject vehicle V1 travels.

The travel plan when the avoidance vehicle risk potential is calculated will then be described. When the avoidance vehicle detection unit 1614 actually detects the other vehicle V2x which avoids the risk due to the primary estimated risk potential and the avoidance vehicle risk potential generation unit 1615 calculates the avoidance vehicle risk potential, the route calculation unit 160 of the present embodiment determines whether or not the risk due to the detected other vehicle V2x can be avoided. Then, when a determination is made that the risk due to the other vehicle V2x can be avoided, a lane change is performed to avoid the risk.

For example, in the travel scene illustrated in FIG. 12, it is assumed that a preceding vehicle is present ahead of the subject vehicle V1 which travels in the left lane of the road D1 and the preceding vehicle travels in the same left lane as the subject vehicle V1. It is also assumed that the preceding vehicle encounters the stopped other vehicles V2a and V2b during the travel and changes lanes from the left lane of the road D1 to the center lane to continue traveling. In this case, the avoidance vehicle detection unit 1614 detects the preceding vehicle as a vehicle that avoids the stopped other vehicles V2a and V2b. Then, on the basis of the predicted travel movement of changing lanes from the left lane of the road D1 to the center lane, the avoidance vehicle risk potential generation unit 1615 calculates the avoidance vehicle risk potential which is arranged behind the other vehicle V2b, for example, in the center lane of the road D1. In this case, the subject vehicle V1 travels, for example, along the travel route R1a thereby to change lanes from the center lane to the right lane before encountering the avoidance vehicle risk potential and can avoid the risk of being interrupted by the other vehicle V2x.

On the other hand, when a determination is made that the risk due to the avoidance vehicle risk potential, such as the other vehicle V2x, cannot be avoided and the risk will be encountered, the route calculation unit 160 of the present embodiment calculates a new travel plan to suppress the risk before encountering the risk. A scene in which the risk due to the avoidance vehicle risk potential cannot be avoided and a new travel plan for suppressing the risk will be described below with reference to FIGS. 13A and 13B.

Figure 13A:
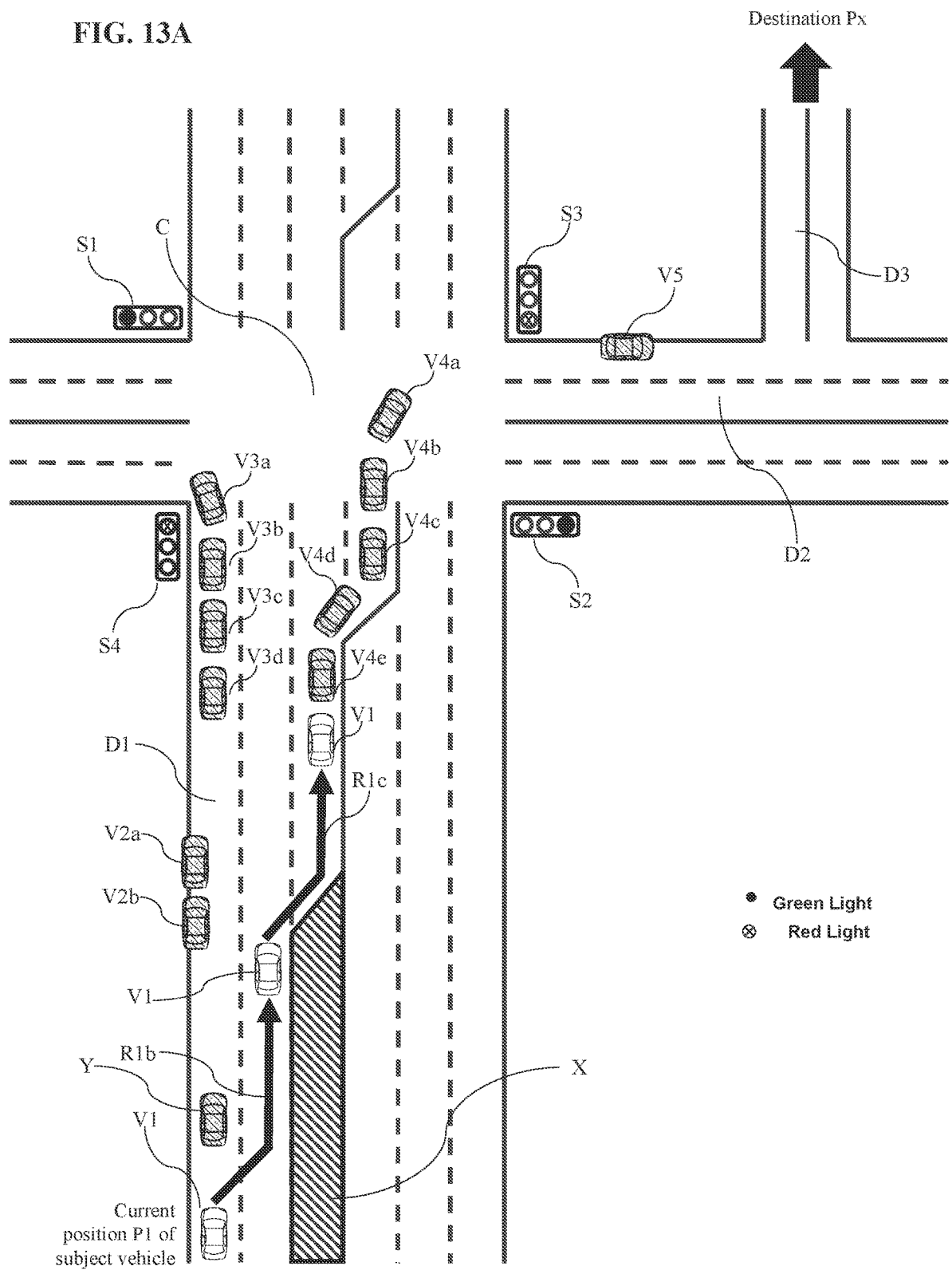
FIG. 13A is a plan view illustrating another example of the final travel route determined by the action determining unit of FIG. 3 for the travel route of FIG. 6.

FIG. 13A is a plan view illustrating an example of a travel scene in which the risk due to the avoidance vehicle risk potential cannot be avoided. In the travel scene illustrated in FIG. 13A, it is assumed that the subject vehicle V1 travels from the current position P1 to the destination Px along the travel route R illustrated in FIG. 6. In the travel scene illustrated in FIG. 13A, it is also assumed that, as in the travel scene illustrated in FIG. 7, the stopped other vehicles V2a and V2b are present on the road shoulder in the left lane of the road D1 and the traffic congestion occurs due to the other vehicles V3a to V3d which are waiting for the left turn. It is also assumed that the traffic congestion occurs in the right lane and right-turn-only lane of the road D1 due to the other vehicles V4a to V4e which are waiting for the right turn and the other vehicle V5 stopped on the road shoulder is present in the left lane of the road D2. In the travel scene illustrated in FIG. 13A, it is further assumed that there is a non-travelable area X such as road construction in the right lane of the road D1 and a preceding vehicle Y that travels in the left lane of the same road D1 as the subject vehicle V1 is present ahead of the subject vehicle V1.

In the travel scene illustrated in FIG. 13A, the subject vehicle V1 has to turn right at the intersection C to reach the destination Px. Therefore, in order for the subject vehicle V1 to reach the right-turn-only lane of the road D1, the route calculation unit 160 calculates a travel route, for example, from the current position P1 to the rearmost other vehicle V4*e* of the traffic congestion of waiting for the right turn. In this case, the route calculation unit 160 calculates, for example, travel routes R1*b* and R1*c* illustrated in FIG. 13A. The travel routes R1*b* and R1*c* are routes that are calculated so as to avoid as much as possible the primary estimated risk potential and the secondary estimated risk potential due to the stopped other vehicles V2*a* and V2*b* and the traffic congestions of waiting for the right turn and the left turn.

Here, when traveling along the travel route R1*b*, the subject vehicle V1 has to travel in the center lane of the road D1 to the rear of the stopped other vehicle V2*b*. However, the preceding vehicle Y is present ahead of the subject vehicle V1, and the stopped other vehicles V2*a* and V2*b* are present ahead of the preceding vehicle Y. It is therefore predicted that the preceding vehicle Y avoids the other vehicles V2*a* and V2*b* by changing lanes from the left lane of the road D1 to the center lane in order to continue traveling. In this case, the avoidance vehicle detection unit 1614 detects the preceding vehicle Y as another vehicle that avoids the other vehicles V2*a* and V2*b*. Then, on the basis of the predicted travel movement of the preceding vehicle Y to change lanes from the left lane of the road D1 to the center lane, the avoidance vehicle risk potential generation unit 1615 calculates the avoidance vehicle risk potential arranged behind the other vehicle V2*b*, for example, in the center lane of the road D1. Therefore, when traveling along the travel route R1*b* in the travel scene illustrated in FIG. 13A, the subject vehicle V1 cannot avoid the risk of being interrupted by the preceding vehicle Y ahead in the traveling direction in the center lane of the road D1, that is, the risk due to the avoidance vehicle risk potential.

In this case, the route calculation unit 160 determines that the risk of being interrupted by the preceding vehicle Y cannot be avoided, and newly calculates a travel plan that, even if interrupted by the preceding vehicle Y when traveling along the travel route R1*b*, can suppress the risk due to the interruption. The route calculation unit 160 calculates, for example, a new travel plan in which the subject vehicle V1 travels at a vehicle speed that is slower than the vehicle speed, which the driver sets, by a predetermined value or more. Here, the predetermined value can be set to an appropriate value that can suppress the risk due to the predicted travel movement of the other vehicle which avoids the risk such as interruption. Alternatively or in addition to this, the route calculation unit 160 may calculate a new travel plan such that the inter-vehicle distance between the subject vehicle V1 and the other vehicle which avoids the risk such as the preceding vehicle Y is maintained at a predetermined inter-vehicle distance or more. Here, the predetermined inter-vehicle distance can be set to an appropriate value that can suppress the risk due to the predicted travel movement of the other vehicle which avoids the risk such as interruption.

Additionally or alternatively, for example, when the subject vehicle V1 and the preceding vehicle Y are traveling in the same lane and the other vehicle which avoids the risk interrupts ahead of the preceding vehicle Y, the route calculation unit 160 can refer to the relationship between the subject vehicle V1 and the preceding vehicle Y to calculate a new travel plan that suppresses the risk. For example, the route calculation unit 160 may calculate a new travel plan such that the relative vehicle speed between the subject vehicle V1 and the preceding vehicle Y is maintained at a predetermined relative vehicle speed or less. Here, the predetermined relative vehicle speed can be set to an appropriate value that can suppress the risk due to the predicted travel movement of the other vehicle which avoids the risk. Alternatively or in addition to this, the route calculation unit 160 may calculate a new travel plan such that the inter-vehicle distance between the subject vehicle V1 and the preceding vehicle Y is maintained at a predetermined inter-vehicle distance or more. Here, the predetermined inter-vehicle distance can be set to an appropriate value that can suppress the risk due to the predicted travel movement of the other vehicle which avoids the risk.

Figure 13B:
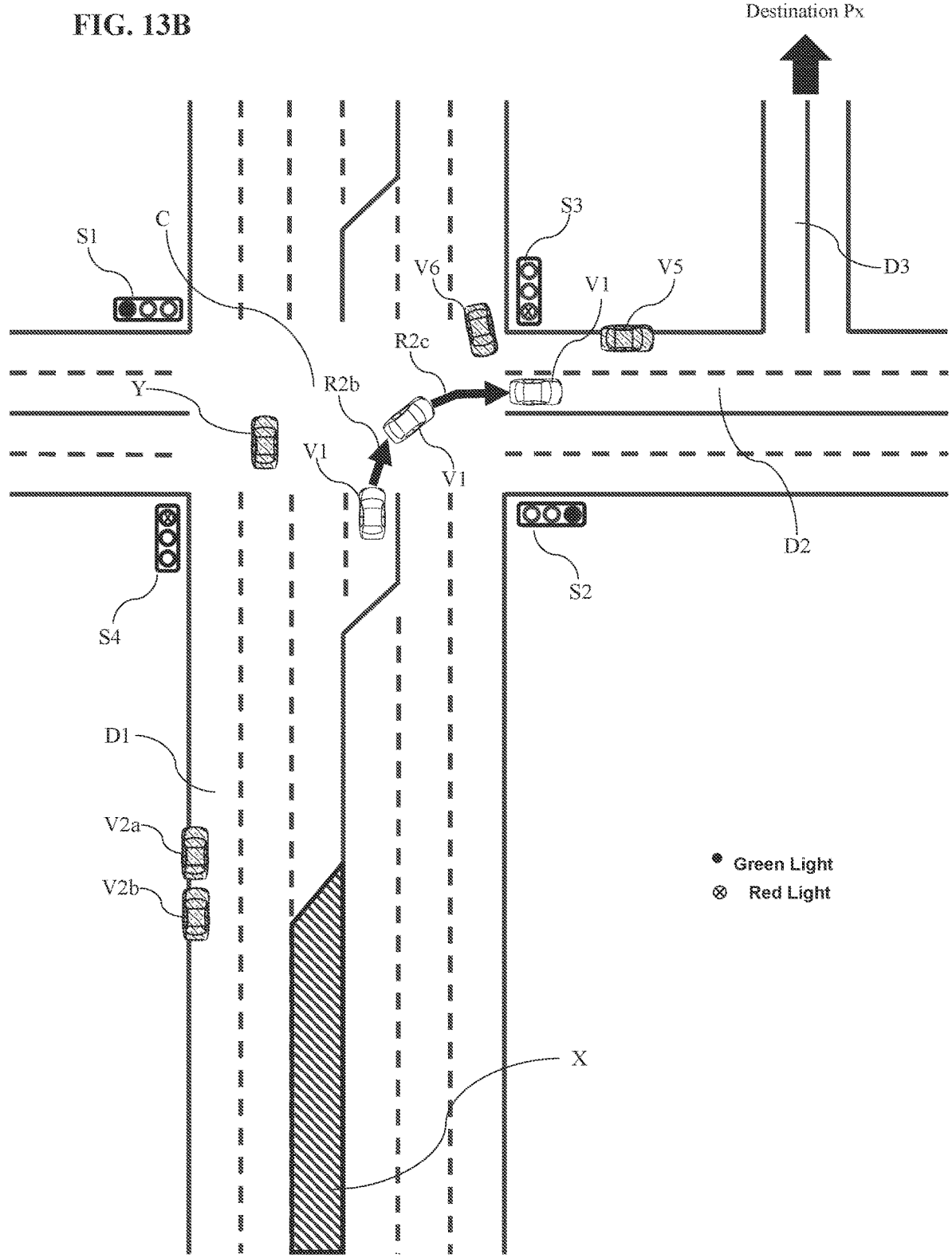
FIG. 13B is a plan view illustrating still another example of the final travel route determined by the action determining unit of FIG. 3 for the travel route of FIG. 6.

The scene in which the risk due to the avoidance vehicle risk potential cannot be avoided is not limited to the scene illustrated in FIG. 13A and may occur, for example, when the subject vehicle V1 turns right as illustrated in FIG. 13B. The travel scene illustrated in FIG. 13B follows the travel scene illustrated in FIG. 13A and it is assumed that the traffic congestion of waiting for the left turn occurring in the left lane of the road D1 and the traffic congestion of waiting for the right turn occurring in the right lane of the road D1 are cleared and the vehicle V1 is about to turn right at the intersection C. It is also assumed that the preceding vehicle Y continues traveling in the center lane of the road D1 and passes straight through the intersection C. It is also assumed that the other vehicle V5 is stopped in the left lane of the road D2 as in the travel scene illustrated in FIG. 13A. It is also assumed that, unlike the travel scene of FIG. 13A, another vehicle V6 that turns left is present in the intersection C in which the subject vehicle V1 is about to turn right and at a position facing the subject vehicle V1.

In the travel scene illustrated in FIG. 13B, when turning right at the intersection C, the subject vehicle V1 enters the right lane of the road D2 in order to avoid the risk of changing lanes from the left lane of the road D2 to the right lane after turning right so as to avoid the other vehicle V5. On the other hand, the other vehicle V6 is predicted to enter the right lane of the road D2 because the other vehicle V6 avoids the stopped other vehicle V5 before the left turn rather than after the left turn and continues traveling without changing lanes after the left turn. In this case, if the other vehicle V6 enters the right lane of the road D2 when turning left in accordance with the predicted travel movement, the other vehicle V6 may interrupt ahead of the subject vehicle V1 while the subject vehicle V1 is turning right at the intersection C. In this case, the avoidance vehicle detection unit 1614 detects the oncoming left-turn vehicle V6 as another vehicle that avoids the other vehicle V5. Then, on the basis of the predicted travel movement of the oncoming left-turn vehicle V6 entering the right lane of the road D2, the avoidance vehicle risk potential generation unit 1615 calculates the avoidance vehicle risk potential which is arranged in the intersection C at the position illustrated with the third darkest color in FIG. 11.

In this case, for example, before the subject vehicle V1 enters the intersection C, the route calculation unit 160 calculates a travel plan in which the subject vehicle V1 does not enter the intersection, and can thereby avoid the risk of being interrupted by the oncoming left-turn vehicle V6 in the intersection C. On the other hand, in this case, for example, if the subject vehicle V1 has entered the intersection C, the subject vehicle V1 cannot move back to return to the right-turn-only lane and therefore cannot avoid the risk of being interrupted by the oncoming left-turn vehicle V6 in the intersection C, that is, the risk due to the avoidance vehicle risk potential. Thus, when the risk due to the avoidance vehicle risk potential cannot be avoided, the route calculation unit 160 determines that the risk of being interrupted by the oncoming left-turn vehicle V6 cannot be avoided, and newly calculates a travel plan that can suppress the risk due to the interruption. For example, the route calculation unit 160 calculates a route along which the subject vehicle V1 once stops and waits in the intersection C (route R2b), and resumes the right turn (route R2c) after the oncoming left-turn vehicle V6 enters the right lane of the road D2. Alternatively to this, provided that the subject vehicle V1 turns right at the intersection C, when there is a plurality of right-turn lanes that are derived lanes in the intersection C and the other vehicle V6 which turns left and faces the subject vehicle, for example, the route calculation unit 160 may select a lane with the lowest risk potential among the right-turn lanes in the intersection C, which are the derived lanes, to calculate the travel plan before the subject vehicle V1 enters the intersection C.

Also when the subject vehicle V1 turns left as in the case of turning right, the route calculation unit 160 newly calculates a travel plan that can suppress the risk due to the interruption. For example, in the travel scene of FIG. 13B, it is assumed that the subject vehicle V1 and the oncoming left-turn vehicle V6 are exchanged, the subject vehicle V1 turns left from the position of V6 and enters the right lane of the road D2, and the oncoming right-turn vehicle is present at the position of V1. In this case, when a determination is made that the subject vehicle V1 has entered the intersection C and cannot avoid the risk of being interrupted by the oncoming right-turn vehicle, the route calculation unit 160 calculates a travel plan, for example, to travel at a vehicle speed that is slower than the set vehicle speed, which the driver sets, by a predetermined value or more. Here, the predetermined value can be set to an appropriate value that can suppress the risk due to the predicted travel movement of the oncoming right-turn vehicle which avoids the risk. Alternatively to this, the route calculation unit 160 can set the leftmost lane among the lanes after the left turn (i.e., the left lane of the road D2) as the lane in which the subject vehicle V1 travels after the left turn, and newly calculate the travel plan. With this travel route, the risk due to the avoidance vehicle risk potential can be avoided. However, to continue traveling, it is necessary to change lanes from the left lane to the right lane behind the other vehicle V5.

Figure 4:
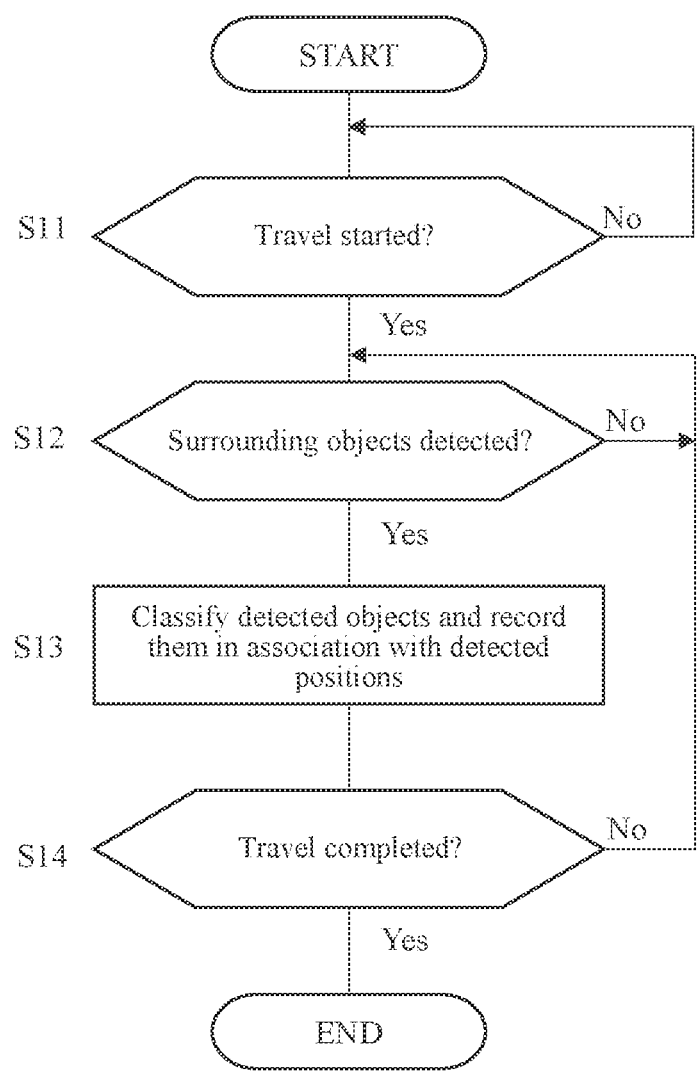
FIG. 4 is a flowchart (part 1) illustrating an example of an information processing procedure in the route calculation unit of FIG. 3.

The processing content executed by the route calculation unit 160 will then be described. FIG. 4 is a flowchart illustrating the information processing procedure in the surrounding object information storage unit 1603 of the route calculation unit 160 and FIGS. 5A and 5B are flowcharts illustrating the information processing procedure in the predicted risk map generation unit 1605, actualized risk map learning unit 1610, actualized risk map generation unit 1611, risk map integration unit 1612, and action determination unit 1613 of the route calculation unit 160.

First, when each vehicle travels on an arbitrary road, the process illustrated in FIG. 4 is executed, and the data accumulated by this is used for subsequent travel assistance for each vehicle. In step S11 of FIG. 4, a determination is made as to whether or not each vehicle has started the travel, and when the travel is started, the process proceeds to step S12, in which surrounding objects are detected by using the sensors 1 such as a camera and a ranging sensor. When the vehicle has not started the travel, step S11 is repeated.

When objects around the subject vehicle are detected in step S12, the process proceeds to step S13, in which the objects detected by using the environment recognition device 5 and the object recognition device 6 are classified and the subject vehicle information detection device 4 is used to acquire the positional information of the positions at which the objects are detected. Then, the classification related to the risk potentials of the detected objects are associated with the detected positions and stored in the storage unit 1604. In step S14, a determination is made as to whether or not the travel of the subject vehicle has been completed, and when the travel of the subject vehicle has not been completed, the process returns to step S12, from which the detection of objects and the accumulation of data are repeated until the travel is completed. A large amount of data in which the classified objects and the positional information are associated with each other is accumulated in the storage unit 1604, and it is thereby possible to obtain experimental risk potential data at an arbitrary position.

Figure 5A:
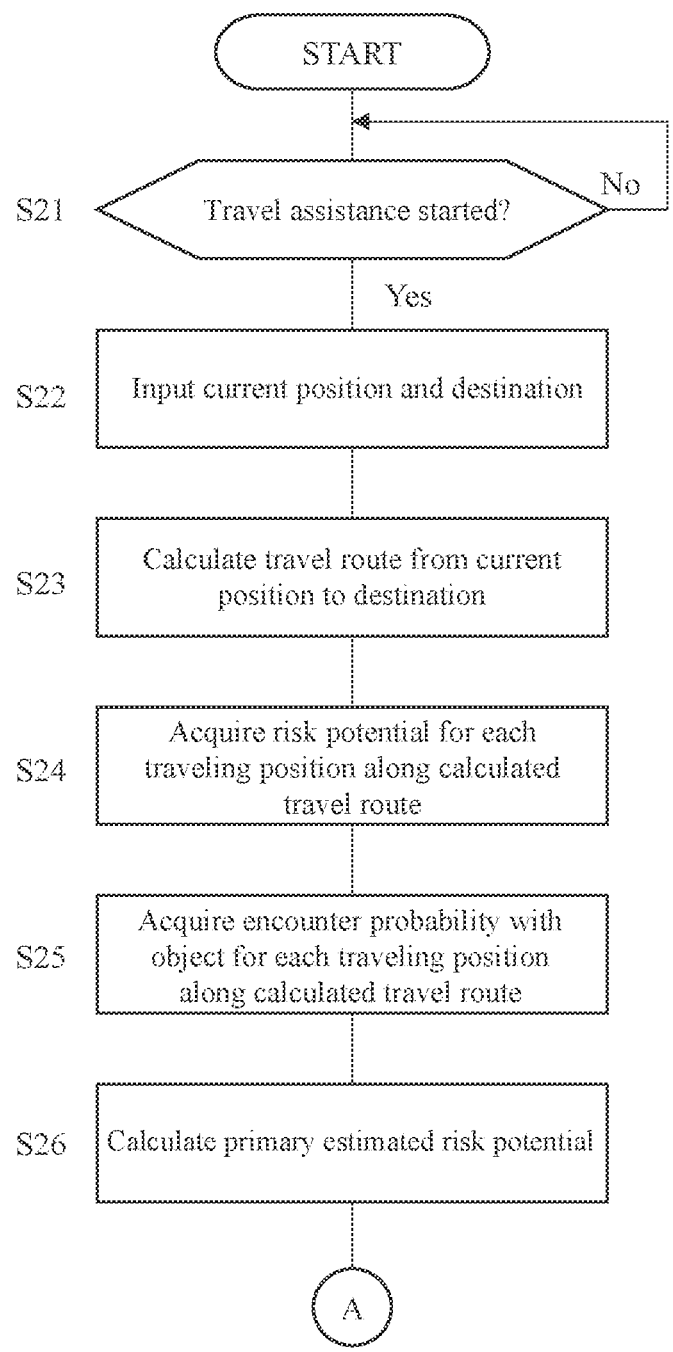
FIG. 5A is a flowchart (part 2) illustrating an example of the information processing procedure in the route calculation unit of FIG. 3.
Figure 5B:
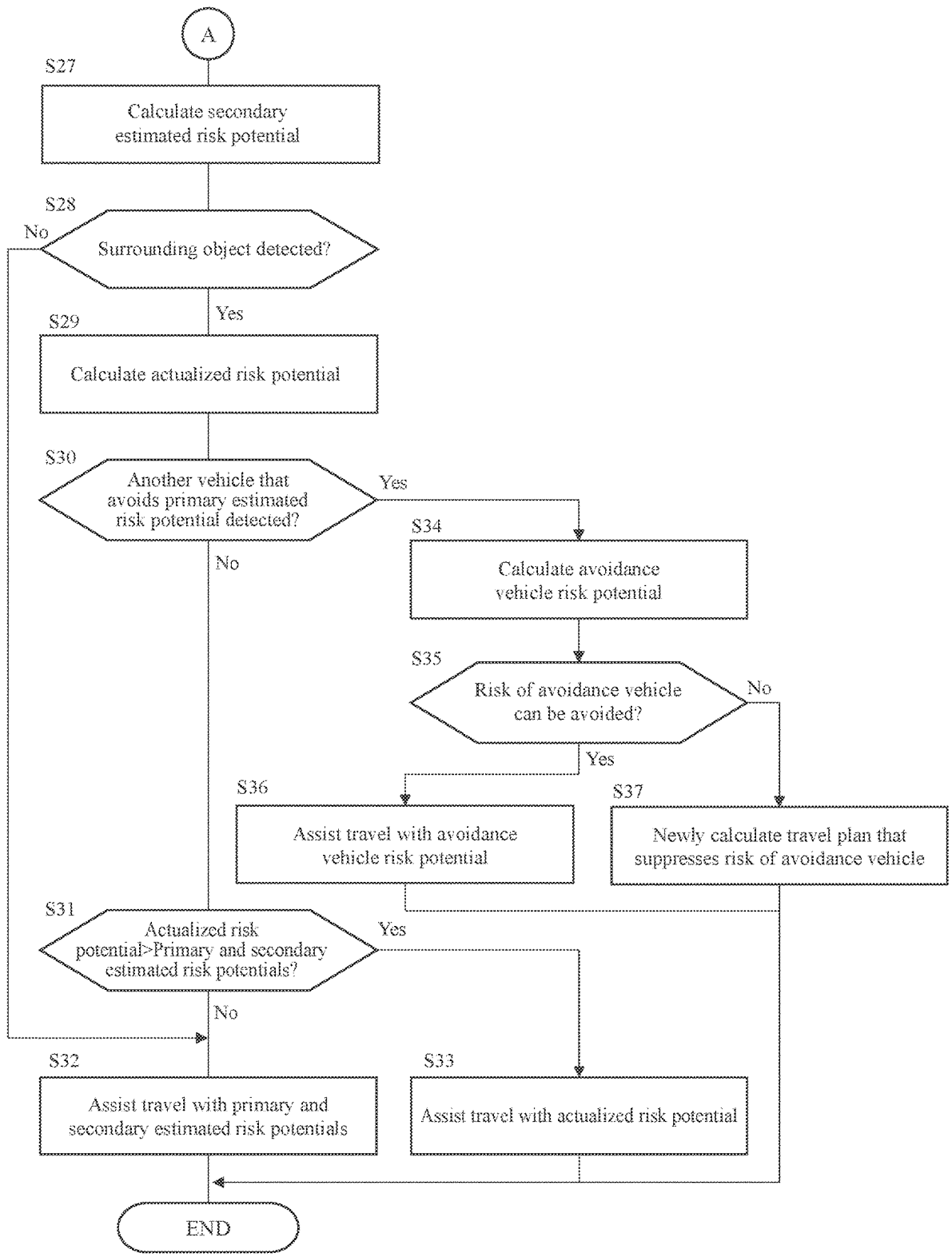
FIG. 5B is a flowchart (part 3) illustrating an example of the information processing procedure in the route calculation unit of FIG. 3.

Then, when starting the travel assistance of the subject vehicle, the processes illustrated in FIGS. 5A and 5B are executed. It is assumed that the travel assistance of the present embodiment is travel assistance in which the driver inputs a destination and autonomous travel control is performed by using the travel route R from the current position P1 to the destination Px. Destinations include, in addition to the final destination, an intermediate point and an intersection that will be encountered next, such as an intersection at which, for example, a left turn is scheduled. In this case, first, in step S21 of FIG. 5A, a determination is made as to whether or not the travel assistance of the subject vehicle has started, and when the travel assistance of the subject vehicle has started, the process proceeds to step S22. When the travel assistance of the subject vehicle has not started, step S21 is repeated. In step S22, the driver is prompted to input the destination, the current position P1 of the subject vehicle V1 is acquired by the subject vehicle information detection device 4, and the destination Px input by the driver is acquired.

In step S23, the travel route R is calculated based on the current position P1 of the subject vehicle V1 and the destination Px which are acquired in step S22. In the subsequent step S24, the risk potential for each traveling position (i.e., for each road section and for each lane) along the travel route R calculated in step S23 is acquired from the storage unit 1604. In the subsequent step S25, the encounter probability with an object for each traveling position (i.e., for each road section and for each lane) along the travel route R calculated in step S23 is acquired from the storage unit 1604. Then, in the subsequent step S26, the primary estimated risk potential is calculated by multiplying the risk potential of each detected object by the encounter probability. The respective risk potentials of the detected objects and the encounter probabilities are acquired in steps S24 and S25. After calculating the primary estimated risk potential in step S26, the process proceeds to step S27 of FIG. 5B, in which the secondary estimated risk potential is calculated by using the risk potential and the encounter location, which are used for calculating the primary estimated risk potential. After starting the travel assistance of the subject vehicle V1, preferably, the processes of steps S22 to S27 are executed before starting the travel, and the travel route R is set by selecting the road sections and lanes in which the primary and secondary estimated risk potentials are the smallest.

When the subject vehicle V1 starts traveling, in step S28, a surrounding object is detected in real time, and when the object is detected, the process proceeds to step S29, in which the actualized risk map generation unit 1611 calculates the actualized risk potential of the detected object. Then, after calculating the actualized risk potential, in step S30, the avoidance vehicle detection unit 1614 may determine whether or not there is the other vehicle which avoids the risk due to the primary estimated risk potential. When a determination is made that the other vehicle which avoids the risk due to the primary estimated risk potential is not present, the process proceeds to step S31. On the other hand, when a determination is made that the other vehicle which avoids the risk due to the primary estimated risk potential is present, the process proceeds to step S34.

When the process proceeds to step S31, the primary and secondary estimated risk potentials are compared with the actualized risk potential, and the travel of the vehicle is assisted based on the larger risk potential. That is, when the primary and secondary estimated risk potentials are larger, the process proceeds to step S32, in which the travel assistance giving priority to the predicted risk potentials is executed. On the other hand, when the actualized risk potential is larger, the process proceeds to step S33, in which the travel assistance giving priority to the actualized risk potential is executed.

On the other hand, when the process proceeds to step S34, the avoidance vehicle risk potential generation unit 1615 calculates the avoidance vehicle risk potential and the process proceeds to step S35. In step S35, a determination is made as to whether the other vehicle detected in step S30 which avoids the risk can be avoided. When a determination is made that the risk can be avoided, the process proceeds to step S36, in which the travel assistance is executed by using the avoidance vehicle risk potential. On the other hand, when a determination is made that the risk cannot be avoided, the process proceeds to step S37, in which the route calculation unit 160 newly calculates a travel plan that suppresses the risk due to the avoidance vehicle risk potential. Step S30 and steps S34 to S37 can be omitted as needed.

When no surrounding object is detected in real time in step S28, the process proceeds to step S32 without executing steps S29, S30, and S31 so as to prioritize the travel assistance by the primary and secondary estimated risk potentials.

As described above, according to the travel assistance method for a vehicle and the assistance device of the present embodiment, when an object is detected by the vehicle, a risk potential of the object is obtained, the risk potential of the object is associated with an encounter location at which the object is encountered, the risk potential at the encounter location is accumulated, and the accumulated risk potential at the encounter location is used to obtain a primary estimated risk potential of the object predicted to be encountered at the encounter location. The primary estimated risk potential is lower than the risk potential obtained when the object is detected. Then, a secondary estimated risk potential lower than the primary estimated risk potential is obtained by using a predicted travel movement of another vehicle that avoids a risk due to the primary estimated risk potential, and when traveling at the encounter location again, travel of the vehicle is autonomously controlled by using the secondary estimated risk potential. This allows the risk potential to be estimated before reaching the encounter location at which the detected object is encountered, and it is therefore possible to perform, even before detecting the object, the travel assistance capable of avoiding any risk that may arise. When the primary estimated risk potential is set, the travel of the subject vehicle V1 may be obstructed by the action of the other vehicle that avoids the risk due to the primary estimated risk potential. However, fortunately, when the primary estimated risk potential is set, the secondary estimated risk potential which may occur due to the primary estimated risk potential is set thereby to allow the travel plan to be created preliminarily with consideration for the primary estimated risk potential and the secondary estimated risk potential which occurs due to the primary estimated risk potential, and it is possible to realize the travel in which unnecessary stop, deceleration, and behavior are suppressed.

Moreover, according to the travel assistance method for a vehicle and the assistance device of the present embodiment, the secondary estimated risk potential is arranged behind the encounter location in an adjacent lane to a lane corresponding to the encounter location with the primary estimated risk potential. Through this arrangement, it is possible to accurately perceive the risk due to the other vehicle that may interrupt the lane, in which the subject vehicle V1 is traveling, in order to avoid the risk ahead in the traveling direction of the subject vehicle V1, and the unnecessary stop, deceleration, etc. can be suppressed.

Moreover, according to the travel assistance method for a vehicle and the assistance device of the present embodiment, the magnitude of the secondary estimated risk potential increases in proportion to the magnitude of the primary estimated risk potential. This allows the magnitude of the secondary estimated risk potential to be set in accordance with the risk due to the primary estimated risk potential.

Moreover, according to the travel assistance method for a vehicle and the assistance device of the present embodiment, a tertiary or higher predicted risk potential is obtained in a second adjacent lane that is adjacent to the adjacent lane by using the secondary estimated risk potential, and when traveling at the encounter location again, the travel of the vehicle is autonomously controlled by using the tertiary or higher predicted risk potential. Through this operation, the tertiary or higher predicted risk potential which may occur due to the secondary estimated risk potential is set, and the travel plan can be created preliminarily with consideration for the tertiary or higher predicted risk potential; therefore, it is possible to realize the travel in which unnecessary stop, deceleration, and behavior are suppressed.

Moreover, according to the travel assistance method for a vehicle and the assistance device of the present embodiment, provided that the subject vehicle V1 makes a left turn, when the intersection C is located behind the primary estimated risk potential arranged in a lane after the left turn with respect to the traveling direction of the subject vehicle V1, the secondary estimated risk potential is arranged in a lane other than the lane in which the primary estimated risk potential exists among lanes after the left turn or during the left turn. Through this arrangement, it is possible to accurately perceive the risk due to the right-turn vehicle which avoids the primary estimated risk potential arranged in the lane after the left turn, and the unnecessary stop, deceleration, etc. can be suppressed.

Moreover, according to the travel assistance method for a vehicle and the assistance device of the present embodiment, provided that the subject vehicle V1 makes a right turn, when the intersection C is located behind the primary estimated risk potential arranged in a lane after the right turn with respect to the traveling direction of the subject vehicle V1, the secondary estimated risk potential is arranged in a lane other than the lane in which the primary estimated risk potential exists among lanes after the right turn or during the right turn. Through this arrangement, it is possible to accurately perceive the risk due to the left-turn vehicle which avoids the primary estimated risk potential arranged in the lane after the right turn, and the unnecessary stop, deceleration, etc. can be suppressed.

Moreover, according to the travel assistance method for a vehicle and the assistance device of the present embodiment, when there are two or more lanes other than the lane in which the primary estimated risk potential exists among the lanes after the left turn or the right turn, the secondary estimated risk potential is arranged in a lane closest to the primary estimated risk potential among the lanes other than the lane in which the primary estimated risk potential exists. Through this arrangement, it is possible to accurately perceive the risk due to the right-turn vehicle which avoids the primary estimated risk potential arranged in the lane after the left turn and the risk due to the left-turn vehicle which avoids the primary estimated risk potential arranged in the lane after the right turn, and the unnecessary stop, deceleration, etc. can be suppressed.

Moreover, according to the travel assistance method for a vehicle and the assistance device of the present embodiment, the risk is increased in the lanes after the left turn or the right turn from a lane with the secondary estimated risk potential close to the primary estimated risk potential, among the secondary estimated risk potentials arranged in two or more lanes, with respect to the traveling direction of the subject vehicle. This allows the primary estimated risk potential arranged in the lane after the left turn or the right turn to be more accurately reflected in the secondary estimated risk potential.

Moreover, according to the travel assistance method for a vehicle and the assistance device of the present embodiment, when the travel of the subject vehicle V1 is autonomously controlled, the object around the subject vehicle V1 is detected. When the object is detected, the actualized risk potential of the object is obtained, and the highest risk potential among the actualized risk potential, the primary estimated risk potential, and the secondary estimated risk potential is calculated as the integrated risk. The travel of the vehicle is autonomously controlled by using the integrated risk. This enables the travel while selecting the highest potential among the calculated risk potentials, and it is possible to perform the travel assistance capable of avoiding any risk that may arise. Furthermore, the travel plan can be created preliminarily with consideration for the actualized risk potential, the primary estimated risk potential, and the secondary estimated risk potential and it is possible to realize the travel in which unnecessary stop, deceleration, and behavior are suppressed.

Moreover, according to the travel assistance method for a vehicle and the assistance device of the present embodiment, the integrated risk calculated from the actualized risk potential, the primary estimated risk potential, and the secondary estimated risk potential is used to set the lane in which the subject vehicle travels. This allows the lane to be selected based on the highest potential among the calculated risk potentials, and it is possible to perform the travel assistance capable of avoiding any risk that may arise. Furthermore, it is possible to realize the travel in which unnecessary stop, deceleration, and behavior are suppressed.

Moreover, according to the travel assistance method for a vehicle and the assistance device of the present embodiment, when the risk potential is calculated for the same risk, the actualized risk potential is the largest, the primary estimated risk potential is the second largest, and the secondary estimated risk potential is the smallest. This allows the travel assistance to be performed based on the actualized risk potential due to the object which is detected during the travel, and the actual risk can be avoided. Thus, unnecessary stop, deceleration, and behavior can be suppressed.

Moreover, according to the travel assistance method for a vehicle and the assistance device of the present embodiment, the travel of the subject vehicle V1 is autonomously controlled so as to change lanes in a direction of avoiding the secondary estimated risk potential. This can avoid any risk that may arise, and unnecessary stop, deceleration, and behavior can be suppressed.

Moreover, according to the travel assistance method for a vehicle and the assistance device of the present embodiment, a determination is made as to whether or not there is another vehicle that avoids the risk due to the primary estimated risk potential. When a determination is made that there is the other vehicle, the avoidance vehicle risk potential is obtained by using the predicted travel movement of the other vehicle, and the travel of the vehicle is autonomously controlled by using the avoidance vehicle risk potential. Through this operation, the secondary estimated risk potential and the avoidance vehicle risk potential higher than the secondary estimated risk potential can be used thereby to further avoid any risk that may occur, as compared with the case of using only the secondary estimated risk potential.

Moreover, according to the travel assistance method for a vehicle and the assistance device of the present embodiment, the avoidance vehicle risk potential is arranged behind the encounter location in an adjacent lane to the lane corresponding to the encounter location with the primary estimated risk potential. Through this arrangement, it is possible to accurately perceive the risk due to the other vehicle that interrupts the lane, in which the subject vehicle V1 is traveling, in order to avoid the risk ahead in the traveling direction of the subject vehicle V1, and the unnecessary stop, deceleration, etc. can be suppressed.

Moreover, according to the travel assistance method for a vehicle and the assistance device of the present embodiment, the avoidance vehicle risk potential is arranged at the same position as that of the secondary estimated risk potential obtained by using the predicted travel movement of the other vehicle that avoids the risk due to the primary estimated risk potential. Through this arrangement, it is possible to accurately perceive the risk due to the other vehicle that interrupts the lane, in which the subject vehicle V1 is traveling, in order to avoid the risk ahead in the traveling direction of the subject vehicle V1, and the unnecessary stop, deceleration, etc. can be suppressed.

Moreover, according to the travel assistance method for a vehicle and the assistance device of the present embodiment, the avoidance vehicle risk potential is obtained by weighting the secondary estimated risk potential obtained by using the predicted travel movement of the other vehicle that avoids the risk due to the primary estimated risk potential. This allows the magnitude of the avoidance vehicle risk potential to be set in accordance with the risk due to the secondary estimated risk potential.

Moreover, according to the travel assistance method for a vehicle and the assistance device of the present embodiment, when the travel of the subject vehicle V1 is autonomously controlled, the object around the subject vehicle is detected. When the object is detected, the actualized risk potential of the object is obtained, and the highest risk potential among the actualized risk potential, the primary estimated risk potential, the secondary estimated risk potential, and the avoidance vehicle risk potential is calculated as the integrated risk. The travel of the vehicle is autonomously controlled by using the integrated risk. This enables the travel while selecting the highest potential among the calculated risk potentials, and it is possible to perform the travel assistance capable of avoiding any risk that may arise. Furthermore, the travel plan can be created preliminarily with consideration for the actualized risk potential, the primary estimated risk potential, the secondary estimated risk potential, and the avoidance vehicle risk potential and it is possible to realize the travel in which unnecessary stop, deceleration, and behavior are suppressed.

Moreover, according to the travel assistance method for a vehicle and the assistance device of the present embodiment, the integrated risk calculated from the actualized risk potential, the primary estimated risk potential, the secondary estimated risk potential, and the avoidance vehicle risk potential is used to set the lane in which the subject vehicle travels. This allows the lane to be selected based on the highest potential among the calculated risk potentials, and it is possible to perform the travel assistance capable of avoiding any risk that may arise. Furthermore, it is possible to realize the travel in which unnecessary stop, deceleration, and behavior are suppressed.

Moreover, according to the travel assistance method for a vehicle and the assistance device of the present embodiment, a determination is made as to whether or not the risk due to the avoidance vehicle risk potential can be avoided. When a determination is made that the risk due to the avoidance vehicle risk potential can be avoided, a change lane is made to avoid the risk due to the avoidance vehicle risk potential. This can avoid any risk that may arise, and unnecessary stop, deceleration, and behavior can be suppressed.

Moreover, according to the travel assistance method for a vehicle and the assistance device of the present embodiment, provided that the subject vehicle V1 turns right at the intersection C, when there is another vehicle V6 that faces the subject vehicle V1 and turns left, the subject vehicle V1 does not enter the intersection. This can prevent a risk of being interrupted by the oncoming left-turn vehicle V6 in the intersection C, and unnecessary stop, deceleration, and behavior can be suppressed.

Moreover, according to the travel assistance method for a vehicle and the assistance device of the present embodiment, provided that the subject vehicle V1 turns right at the intersection C, when there are two or more right-turn lanes in the intersection C and another vehicle V6 that faces the subject vehicle V1 and turns left, a right-turn lane in which the risk potential is lowest is selected from among the right-turn lanes in the intersection C. This can suppress a risk of being interrupted by the oncoming left-turn vehicle V6 in the intersection C, and unnecessary stop, deceleration, and behavior can be suppressed.

Moreover, according to the travel assistance method for a vehicle and the assistance device of the present embodiment, provided that the subject vehicle V1 turns left at the intersection C, when there is another vehicle that faces the subject vehicle V1 and turns right, a leftmost lane among lanes after the subject vehicle V1 turns left is set as the lane in which the subject vehicle V1 travels after turning left. This can suppress a risk due to the oncoming right-turn vehicle, and unnecessary stop, deceleration, and behavior can be suppressed.

Moreover, according to the travel assistance method for a vehicle and the assistance device of the present embodiment, a determination is made as to whether or not the risk due to the avoidance vehicle risk potential can be avoided. When a determination is made that the risk due to the avoidance vehicle risk potential cannot be avoided and the risk will be encountered, a travel plan that suppresses the risk due to the avoidance vehicle risk potential is newly calculated before encountering the risk due to the avoidance vehicle risk potential. This allows the travel plan to be preliminarily created before the secondary estimated risk potential when there is another vehicle that enters the secondary estimated risk potential, and it is possible to realize the travel in which unnecessary stop, deceleration, and behavior are suppressed when traveling at the position arranged with the secondary estimated risk potential.

Moreover, according to the travel assistance method for a vehicle and the assistance device of the present embodiment, the newly calculated travel plan is a travel plan in which the subject vehicle V1 travels at a vehicle speed that is slower than a set vehicle speed, which the driver sets, by a predetermined value or more. This can suppress the risk due to the avoidance vehicle risk potential as compared with the case of traveling at the set vehicle speed.

Moreover, according to the travel assistance method for a vehicle and the assistance device of the present embodiment, the newly calculated travel plan is a travel plan for traveling so as to maintain the relative vehicle speed between the subject vehicle V1 and a preceding vehicle for the subject vehicle V1 at a predetermined relative vehicle speed or less. This can suppress the risk due to the avoidance vehicle risk potential as compared with the case of traveling without considering the relative speed.

Moreover, according to the travel assistance method for a vehicle and the assistance device of the present embodiment, the newly calculated travel plan is a travel plan for traveling so as to maintain the inter-vehicle distance between the subject vehicle V1 and the preceding vehicle Y for the subject vehicle V1 at a predetermined inter-vehicle distance or more. This can suppress the risk due to the avoidance vehicle risk potential as compared with the case of traveling without considering the inter-vehicle distance between the preceding vehicle Y and the subject vehicle V1.

Moreover, according to the travel assistance method for a vehicle and the assistance device of the present embodiment, the newly calculated travel plan is a travel plan for traveling so as to maintain the inter-vehicle distance between the subject vehicle V1 and another vehicle that avoids the risk due to the primary estimated risk potential at a predetermined inter-vehicle distance or more. This can suppress the risk due to the avoidance vehicle risk potential as compared with the case of traveling without considering the inter-vehicle distance between the other vehicle and the subject vehicle V1.

Moreover, according to the travel assistance method for a vehicle and the assistance device of the present embodiment, provided that the subject vehicle V1 turns right at the intersection C, when there is another vehicle V6 that faces the subject vehicle V1 and turns left, the newly calculated travel plan is a travel plan in which the subject vehicle V1 waits in the intersection C. This allows the subject vehicle V1 to resume the right turn after the left turn of the oncoming left-turn vehicle V6 is completed, and the risk due to the oncoming left-turn vehicle V6 can be suppressed.

Moreover, according to the travel assistance method for a vehicle and the assistance device of the present embodiment, provided that the subject vehicle V1 turns right at the intersection C, when there are two or more right-turn lanes in the intersection C and another vehicle V6 that faces the subject vehicle and turns left, the newly calculated travel plan is a travel plan for selecting a right-turn lane in which the risk potential is lowest from among the right-turn lanes in the intersection C. This can suppress the risk due to the oncoming left-turn vehicle V6.

Moreover, according to the travel assistance method for a vehicle and the assistance device of the present embodiment, provided that the subject vehicle V1 turns left at an intersection, when there is another vehicle that faces the subject vehicle V1 and turns right, the newly calculated travel plan is a travel plan in which the subject vehicle V1 travels at a vehicle speed that is slower than a set vehicle speed, which the driver sets, by a predetermined value or more. This can suppress the risk due to the avoidance vehicle risk potential as compared with the case of traveling at the set vehicle speed.

DESCRIPTION OF REFERENCE NUMERALS

1000 Travel assistance system
100 Travel assistance device
10 Processor
11 CPU
12 ROM
13 RAM
110 Output device
111 Communication device
120 Destination setting unit
130 Route planning unit
140 Drive planning unit
150 Travelable area calculation unit
160 Route calculation unit
1601 Surrounding object trajectory acquisition unit
1602 Surrounding object classification unit
1603 Surrounding object information storage unit
1604 Storage unit
1605 Predicted risk map generation unit
1606 Risk potential calculation unit
1607 Encounter probability calculation unit
1608 Primary estimated risk potential generation unit
1609 Secondary estimated risk potential generation unit
1610 Actualized risk map learning unit
1611 Actualized risk map generation unit
1612 Risk map integration unit
1613 Action determination unit
1614 Avoidance vehicle detection unit
1615 Avoidance vehicle risk potential generation unit
170 Driving action control unit
200 Vehicle controller
210 Drive mechanism
211 Communication device
1 Sensors
2 Navigation device
3 Map information
4 Subject vehicle information detection device
5 Environment recognition device
6 Object recognition device
C Intersection
D1 Road
D11 Left lane
D12 Center lane
D13 Right lane
D14 Right-turn-only lane
D2 Road
D21 Left lane
D21a Portion after passing through branch point to road D3
D22 Right lane
D22a Portion near branch point to road D3
D3 Road
D31 Left lane
P1 Current position of subject vehicle
Px Destination of subject vehicle
R, R1, R2, R3, R4 Travel route
Ra, R1a, R2a, R3a, R4a Travel route
R1b, R1c Travel route
R2b, R2c Travel route
R2d, R2e Travel route
Rx, R1x, R2x, R3x, R4x Travel route (comparative example)
S1, S2, S3, S4 Traffic light
V1, V1a Subject vehicle
V2a, V2b, V2c, V2d Other vehicles waiting for left turn
V3a, V3b Other vehicles that are stopped
V4a, V4b, V4c, V4d, V4e Other vehicles waiting for right turn
V5 Another vehicle that is stopped
V6 Oncoming left-turn vehicle
X Non-travelable area
Y Preceding vehicle

The invention claimed is:

1. A travel assistance method for a vehicle, comprising:
when detecting an object by the vehicle, obtaining a risk potential of the object;
associating the risk potential of the object with an encounter location at which the object is encountered and accumulating the risk potential at the encounter location;
using the accumulated risk potential at the encounter location to obtain a primary estimated risk potential of the object predicted to be encountered at a section of a lane corresponding to the encounter location, the primary estimated risk potential being lower than the risk potential obtained when detecting the object;
obtaining a secondary estimated risk potential of a section of an adjacent lane based on a predicted travel movement of another vehicle that avoids a risk due to the primary estimated risk potential of the object predicted to be encountered at the section of the lane corresponding to the encounter location, the secondary estimated risk potential being lower than the primary estimated risk potential; and
when traveling at the encounter location again, autonomously controlling travel of the vehicle using the secondary estimated risk potential.

2. The method according to claim 1, wherein the secondary estimated risk potential is arranged behind the encounter location in the adjacent lane.

3. The method according to claim 1, wherein a magnitude of the secondary estimated risk potential increases in proportion to a magnitude of the primary estimated risk potential.

4. The method according to claim 2, comprising:
obtaining a tertiary or higher predicted risk potential in a second adjacent lane that is adjacent to the adjacent lane using the secondary estimated risk potential; and
when traveling at the encounter location again, autonomously controlling the travel of the vehicle using the tertiary or higher predicted risk potential.

5. The method according to claim 1, wherein provided that a subject vehicle makes a left turn, when an intersection is located behind the primary estimated risk potential arranged in a lane after the left turn with respect to a traveling direction of the subject vehicle, the secondary estimated risk potential is arranged in a lane other than the lane in which the primary estimated risk potential exists among lanes after the left turn or during the left turn.

6. The method according to claim 1, wherein provided that a subject vehicle makes a right turn, when an intersection is located behind the primary estimated risk potential arranged in a lane after the right turn with respect to a traveling direction of the subject vehicle, the secondary estimated risk potential is arranged in a lane other than the lane in which the primary estimated risk potential exists among lanes after the right turn or during the right turn.

7. The method according to claim 5, wherein when there are two or more lanes other than the lane in which the primary estimated risk potential exists, the secondary estimated risk potential is arranged in a lane closest to the primary estimated risk potential among the lanes other than the lane in which the primary estimated risk potential exists.

8. The method according to claim 5, wherein a risk is increased from a lane with the secondary estimated risk potential close to the primary estimated risk potential, among the secondary estimated risk potentials arranged in two or more lanes, with respect to the traveling direction of the subject vehicle.

9. The method according to claim 1, comprising:
when autonomously controlling the travel of a subject vehicle, detecting the object around the subject vehicle;
when detecting the object, obtaining an actualized risk potential of the object;
calculating a highest risk potential among the actualized risk potential, the primary estimated risk potential, and the secondary estimated risk potential as an integrated risk; and
autonomously controlling the travel of the subject vehicle using the integrated risk.

10. The method according to claim 9, comprising
using the integrated risk calculated from the actualized risk potential, the primary estimated risk potential, and the secondary estimated risk potential to set a lane in which the subject vehicle travels.

11. The method according to claim 9, wherein when the risk potential is calculated for a same risk, the actualized risk potential is largest, the primary estimated risk potential is second largest, and the secondary estimated risk potential is smallest.

12. The method according to claim 1, comprising
autonomously controlling the travel of a subject vehicle so as to change lanes in a direction of avoiding the secondary estimated risk potential.

13. The method according to claim 1, comprising:
determining whether or not there is the other vehicle that avoids the risk due to the primary estimated risk potential;
when determining that there is the other vehicle, obtaining an avoidance vehicle risk potential using the predicted travel movement of the other vehicle; and
autonomously controlling the travel of the vehicle using the avoidance vehicle risk potential.

14. The method according to claim 13, wherein the avoidance vehicle risk potential is arranged behind the encounter location in the adjacent lane.

15. The method according to claim 13, wherein the avoidance vehicle risk potential is arranged at a same position as that of the secondary estimated risk potential obtained by using the predicted travel movement of the other vehicle that avoids the risk due to the primary estimated risk potential.

16. The method according to claim 13, wherein the avoidance vehicle risk potential is obtained by weighting the secondary estimated risk potential obtained by using the predicted travel movement of the other vehicle that avoids the risk due to the primary estimated risk potential.

17. The method according to claim 13, comprising:
when autonomously controlling the travel of a subject vehicle, detecting the object around the subject vehicle;
when detecting the object, obtaining an actualized risk potential of the object;
calculating a highest risk potential among the actualized risk potential, the primary estimated risk potential, the secondary estimated risk potential, and the avoidance vehicle risk potential as an integrated risk; and
autonomously controlling the travel of the vehicle using the integrated risk.

18. The method according to claim 17, comprising
using the integrated risk calculated from the actualized risk potential, the primary estimated risk potential, the secondary estimated risk potential, and the avoidance vehicle risk potential to set a lane in which the subject vehicle travels.

19. The method according to claim 13, comprising:
determining whether or not the risk due to the avoidance vehicle risk potential can be avoided; and
when determining that the risk due to the avoidance vehicle risk potential can be avoided, changing lanes to avoid the risk due to the avoidance vehicle risk potential.

20. The method according to claim 13, wherein provided that a subject vehicle turns right at an intersection, when there is another vehicle that faces the subject vehicle and turns left, the subject vehicle does not enter the intersection.

21. The method according to claim 13, wherein provided that a subject vehicle turns right at an intersection, when there are two or more right-turn lanes in the intersection and another vehicle that faces the subject vehicle and turns left, a right-turn lane in which the risk potential is lowest is selected from among the right-turn lanes in the intersection.

22. The method according to claim 13, wherein provided that a subject vehicle turns left at an intersection, when there is another vehicle that faces the subject vehicle and turns right, a leftmost lane among lanes after the subject vehicle turns left is set as a lane in which the subject vehicle travels after turning left.

23. The method according to claim 13, comprising:
determining whether or not the risk due to the avoidance vehicle risk potential can be avoided; and
when determining that the risk due to the avoidance vehicle risk potential cannot be avoided and the risk will be encountered, newly calculating a travel plan that suppresses the risk due to the avoidance vehicle risk potential before encountering the risk due to the avoidance vehicle risk potential.

24. The method according to claim 23, wherein the newly calculated travel plan is a travel plan in which a subject vehicle travels at a vehicle speed that is slower than a set vehicle speed, which a driver sets, by a predetermined value or more.

25. The method according to claim 23, wherein the newly calculated travel plan is a travel plan for traveling so as to maintain a relative vehicle speed between a subject vehicle and a preceding vehicle for the subject vehicle at a predetermined relative vehicle speed or less.

26. The method according to claim 23, wherein the newly calculated travel plan is a travel plan for traveling so as to maintain an inter-vehicle distance between a subject vehicle and a preceding vehicle for the subject vehicle at a predetermined inter-vehicle distance or more.

27. The method according to claim 23, wherein the newly calculated travel plan is a travel plan for traveling so as to maintain an inter-vehicle distance between a subject vehicle and the other vehicle that avoids the risk due to the primary estimated risk potential at a predetermined inter-vehicle distance or more.

28. The method according to claim 23, wherein provided that a subject vehicle turns right at an intersection, when there is another vehicle that faces the subject vehicle and turns left, the newly calculated travel plan is a travel plan in which the subject vehicle waits in the intersection.

29. The method according to claim 23, wherein provided that a subject vehicle turns right at an intersection, when there are two or more right-turn lanes in the intersection and another vehicle that faces the subject vehicle and turns left, the newly calculated travel plan is a travel plan for selecting a right-turn lane in which the risk potential is lowest from among the right-turn lanes in the intersection.

30. The method according to claim 23, wherein provided that a subject vehicle turns left at an intersection, when there is another vehicle that faces the subject vehicle and turns right, the newly calculated travel plan is a travel plan in which a subject vehicle travels at a vehicle speed that is slower than a set vehicle speed, which a driver sets, by a predetermined value or more.

31. A travel assistance device for a vehicle, comprising:
   a sensor for detecting an object around the vehicle;
   a controller for obtaining a risk potential, a primary estimated risk potential, and a secondary estimated risk potential of the object and autonomously controlling travel of the vehicle using the secondary estimated risk potential; and
   a storage that stores information regarding the object detected by the sensor and information regarding a risk potential obtained by the controller,
   the controller operating to:
      when the sensor detects the object, obtain the risk potential of the object;
      associate the risk potential of the object with an encounter location at which the object is encountered and accumulate the risk potential at the encounter location in the storage;
      use the risk potential at the encounter location accumulated in the storage to obtain the primary estimated risk potential of the object predicted to be encountered at a section of a lane corresponding to the encounter location, the primary estimated risk potential being lower than the risk potential obtained when detecting the object;
      obtain the secondary estimated risk potential of a section of an adjacent lane based on a predicted travel movement of another vehicle that avoids a risk due to the primary estimated risk potential of the object predicted to be encountered at the section of the lane corresponding to the encounter location; and
      when traveling at the encounter location again, autonomously control the travel of the vehicle using the secondary estimated risk potential.

* * * * *